US012368879B2

(12) United States Patent
Li et al.

(10) Patent No.: US 12,368,879 B2
(45) Date of Patent: Jul. 22, 2025

(54) METHOD AND APPARATUS ADAPTIVE CONSTRAINT ON BI-PREDICTION FOR OUT-OF-BOUNDARY CONDITIONS

(71) Applicant: Tencent America LLC, Palo Alto, CA (US)

(72) Inventors: Guichun Li, San Jose, CA (US); Xiang Li, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 313 days.

(21) Appl. No.: 17/945,679

(22) Filed: Sep. 15, 2022

(65) Prior Publication Data
US 2023/0308677 A1    Sep. 28, 2023

Related U.S. Application Data

(60) Provisional application No. 63/323,749, filed on Mar. 25, 2022.

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/109* (2014.11);
(Continued)

(58) Field of Classification Search
CPC .. H04N 19/176; H04N 19/577; H04N 19/159; H04N 19/52; H04N 19/513; H04N 19/139

See application file for complete search history.

(56) References Cited

U.S. PATENT DOCUMENTS

| 10,404,992 B2* | 9/2019 | Rapaka ................ H04N 19/159 |
| 2017/0034526 A1* | 2/2017 | Rapaka ................ H04N 19/127 |

(Continued)

FOREIGN PATENT DOCUMENTS

WO    2019/006363 A1    1/2019

OTHER PUBLICATIONS

International Search Report dated Feb. 16, 2023 from the International Searching Authority in International Application No. PCT/2022/044492.

(Continued)

*Primary Examiner* — Daniel Chang
(74) *Attorney, Agent, or Firm* — Sughrue Mion, PLLC

(57) ABSTRACT

A method and apparatus for inter prediction performed by at least one processor. The method for inter prediction comprising: receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture; determining whether an out of boundary condition associated with the first motion vector and the second motion vector is satisfied; and adaptively disallowing bi-prediction to have MVs pointing to out of reference picture boundary, for inter bi-prediction mode.

18 Claims, 24 Drawing Sheets

(51) Int. Cl.
  *H04N 19/109* (2014.01)
  *H04N 19/132* (2014.01)
  *H04N 19/139* (2014.01)
  *H04N 19/159* (2014.01)
  *H04N 19/167* (2014.01)
  *H04N 19/172* (2014.01)
  *H04N 19/176* (2014.01)
  *H04N 19/186* (2014.01)
  *H04N 19/577* (2014.01)

(52) U.S. Cl.
  CPC ......... *H04N 19/132* (2014.11); *H04N 19/139* (2014.11); *H04N 19/159* (2014.11); *H04N 19/167* (2014.11); *H04N 19/172* (2014.11); *H04N 19/176* (2014.11); *H04N 19/186* (2014.11); *H04N 19/577* (2014.11)

(56) References Cited

U.S. PATENT DOCUMENTS

| | | | | |
|---|---|---|---|---|
| 2020/0029090 A1* | 1/2020 | Alshin | ................ | H04N 19/117 |
| 2020/0045336 A1* | 2/2020 | Xiu | ................ | H04N 19/597 |
| 2020/0413089 A1* | 12/2020 | Liao | ................ | H04N 19/139 |
| 2021/0006788 A1* | 1/2021 | Zhang | ................ | H04N 19/139 |
| 2021/0084315 A1 | 3/2021 | Chen et al. | | |
| 2021/0084322 A1 | 3/2021 | Chen et al. | | |
| 2021/0092427 A1 | 3/2021 | Chen et al. | | |
| 2021/0127133 A1 | 4/2021 | Chen et al. | | |
| 2021/0160482 A1* | 5/2021 | Chiu | ................ | H04N 19/59 |
| 2022/0046255 A1* | 2/2022 | Zhu | ................ | H04N 19/593 |
| 2022/0060692 A1* | 2/2022 | Zhang | ................ | H04N 19/136 |
| 2022/0070454 A1* | 3/2022 | Zhang | ................ | H04N 19/159 |
| 2022/0070455 A1* | 3/2022 | Zhang | ................ | H04N 19/635 |
| 2022/0103817 A1* | 3/2022 | Zhang | ................ | H04N 19/117 |
| 2022/0109827 A1* | 4/2022 | Zhang | ................ | H04N 19/557 |
| 2022/0201327 A1* | 6/2022 | Xiu | ................ | H04N 19/44 |
| 2023/0007238 A1* | 1/2023 | Chen | ................ | H04N 19/55 |
| 2023/0224457 A1* | 7/2023 | Ruiz Coll | ............ | H04N 19/55 375/240.02 |
| 2023/0247216 A1* | 8/2023 | Huang | ................ | H04N 19/44 375/240.15 |
| 2023/0308677 A1* | 9/2023 | Li | ................ | H04N 19/139 |

OTHER PUBLICATIONS

Written Opinion dated Feb. 16, 2023 from the International Searching Authority in International Application No. PCT/2022/044492.
Telecommunication Standardization Sector of ITU, "Series H: Audiovisual and Multimedia Systems, Infrastructure of audiovisual services—Coding of moving video, High efficiency video coding", International Telecommunication Union, 2016, 664 pages, Recommendation ITU-T H.265.
Telecommunication Standardization Sector of ITU, "Series H: Audiovisual and Multimedia Systems, Infrastructure of audiovisual services—Coding of moving video, Versatile video coding", International Telecommunication Union, 2020, 516 pages, Recommendation ITU-T H.266.

* cited by examiner

FIG. 21

Table 1 – Specification of AmvrShift in VVC

| | |
|---|---|
| – | If inter_affine_flag[ x0 ][ y0 ] is equal to 0, the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows: |
| | MvdL0[ x0 ][ y0 ][ 0 ] = MvdL0[ x0 ][ y0 ][ 0 ] << AmvrShift (160) |
| | MvdL0[ x0 ][ y0 ][ 1 ] = MvdL0[ x0 ][ y0 ][ 1 ] << AmvrShift (161) |
| | MvdL1[ x0 ][ y0 ][ 0 ] = MvdL1[ x0 ][ y0 ][ 0 ] << AmvrShift (162) |
| | MvdL1[ x0 ][ y0 ][ 1 ] = MvdL1[ x0 ][ y0 ][ 1 ] << AmvrShift (163) |
| – | Otherwise (inter_affine_flag[ x0 ][ y0 ] is equal to 1), the variables MvdCpL0[ x0 ][ y0 ][ 0 ][ 0 ], MvdCpL0[ x0 ][ y0 ][ 0 ][ 1 ], MvdCpL0[ x0 ][ y0 ][ 1 ][ 0 ], MvdCpL0[ x0 ][ y0 ][ 1 ][ 1 ], MvdCpL0[ x0 ][ y0 ][ 2 ][ 0 ] and MvdCpL0[ x0 ][ y0 ][ 2 ][ 1 ] are modified as follows: |
| | MvdCpL0[ x0 ][ y0 ][ 0 ][ 0 ] = MvdCpL1[ x0 ][ y0 ][ 0 ][ 0 ] << AmvrShift (164) |
| | MvdCpL1[ x0 ][ y0 ][ 0 ][ 1 ] = MvdCpL1[ x0 ][ y0 ][ 0 ][ 1 ] << AmvrShift (165) |
| | MvdCpL0[ x0 ][ y0 ][ 1 ][ 0 ] = MvdCpL1[ x0 ][ y0 ][ 1 ][ 0 ] << AmvrShift (166) |
| | MvdCpL1[ x0 ][ y0 ][ 1 ][ 1 ] = MvdCpL1[ x0 ][ y0 ][ 1 ][ 1 ] << AmvrShift (167) |
| | MvdCpL0[ x0 ][ y0 ][ 2 ][ 0 ] = MvdCpL1[ x0 ][ y0 ][ 2 ][ 0 ] << AmvrShift (168) |
| | MvdCpL1[ x0 ][ y0 ][ 2 ][ 1 ] = MvdCpL1[ x0 ][ y0 ][ 2 ][ 1 ] << AmvrShift (169) |

METHOD AND APPARATUS ADAPTIVE CONSTRAINT ON BI-PREDICTION FOR OUT-OF-BOUNDARY CONDITIONS

CROSS REFERENCE TO RELATED APPLICATIONS

This application claims priority under 35 U.S.C. § 119 from U.S. Provisional Application No. 63/323,749 filed on Mar. 25, 2022 in the U.S. Patent & Trademark Office, the disclosure of which is incorporated herein by reference in its entirety.

TECHNICAL FIELD

Methods and apparatuses consistent with example embodiments of the present disclosure relate to MV constraint to adaptively disallow bi-prediction to have MVs pointing to out of reference picture boundary, for inter bi-prediction mode.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC, and the new standard was named Versatile Video Coding (VVC), and JVET was renamed as Joint Video Experts Team. In 2020, ITU-T VCEG (Q6/16) and ISO/IEC MPEG (JTC 1/SC 29/WG 11) published the VVC video coding standard (version 1).

For each inter-predicted coding unit (CU), motion parameters consisting of motion vectors, reference picture indices and reference picture list usage index, and additional information needed for the new coding feature of VVC are used for inter-predicted sample generation.

A picture may have at least one block encoded in accordance with a bi-prediction mode, where the at least one block includes a first motion vector (MV) that points to a first reference picture, and a second MV that points to a second reference picture. When either the first MV or the second MV points to a position that is out of a frame boundary, a constraint on the bi-prediction mode may be applied. For example, this constraint may change the coding mode of the at least one block from the bi-prediction mode to another coding mode such as a uni-prediction mode. The current efforts of applying the constraint for inter bi-prediction when a motion vector (MV) exceeds the frame boundary may not always be beneficial for coding efficiency.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for MV constraint to adaptively disallow bi-prediction to have MVs pointing to out of reference picture boundary, for inter bi-prediction mode.

According to an exemplary embodiment, a method for inter prediction is performed by at least one processor. The method includes receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture. The method further includes determining whether an out of boundary condition associated with the first motion vector and the second motion vector is satisfied. The method further includes, in response to determining the out of boundary condition is satisfied, determining whether a disabling condition for disabling the out of boundary condition is satisfied. The method further includes, in response to the determining the out of boundary condition is satisfied and the disabling condition is not satisfied, (i) changing the at least one block from the inter bi-prediction mode to another coding mode, and (ii) decoding the at least one block in accordance with the another coding mode. The method further includes, in response to the determining the out of boundary condition is not satisfied or the disabling condition is satisfied, decoding the at least one block in accordance with the inter prediction bi-prediction mode.

According to an exemplary embodiment, an apparatus for inter prediction includes at least one memory configured to store computer program code, and at least one processor configured to access the computer program code and operate as instructed by the computer program code. The computer program code includes receiving code configured to cause the at least one processor to receive a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture. The computer program code further includes first determining code configured to cause the at least one processor to determine whether an out of boundary condition associated with the first motion vector and the second motion vector is satisfied. The computer program further includes second determining code configured to cause the at least one processor to, in response to determining the out of boundary condition is satisfied, determine whether a disabling condition for disabling the out of boundary condition is satisfied. The computer program code further includes changing code and decoding code, that in response to the determining the out of boundary condition is satisfied and the disabling condition is not satisfied, (i) the changing code causes the at least one processor to change the at least one block from the inter bi-prediction mode to another coding mode, and (ii) the decoding code causes the at least one processor to decode the at least one block in accordance with the another coding mode. The computer program further includes, in response to the determining the out of boundary condition is not satisfied or the disabling condition is satisfied, the decoding code causes at least one processor to decode the at least one block in accordance with the inter prediction bi-prediction mode.[

According to an exemplary embodiment, a non-transitory computer readable medium having instructions stored therein, which when executed by a processor cause the processor to execute a method for inter prediction. The method includes receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture. The method further includes determining whether an out of boundary condition associated with the first motion vector and the second motion vector is satisfied. The method further includes, in response to determining the out of boundary condition is satisfied, determining whether a disabling condition for disabling the out of boundary condition is satisfied. The method further includes, in response to the determining the out of boundary condition is satisfied and the disabling condition is not satisfied, (i) changing the at least one block from the inter bi-prediction mode to another coding mode, and (ii) decoding the at least one block in accordance with the another coding mode. The method further includes, in response to the determining the out of boundary condition is not satisfied or the disabling condition is satisfied, decoding the at least one block in accordance with the inter prediction bi-prediction mode.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 21 is a table of specifications of AmvrShift in VVC in accordance with an embodiment.

DETAILED DESCRIPTION

Figure 1:
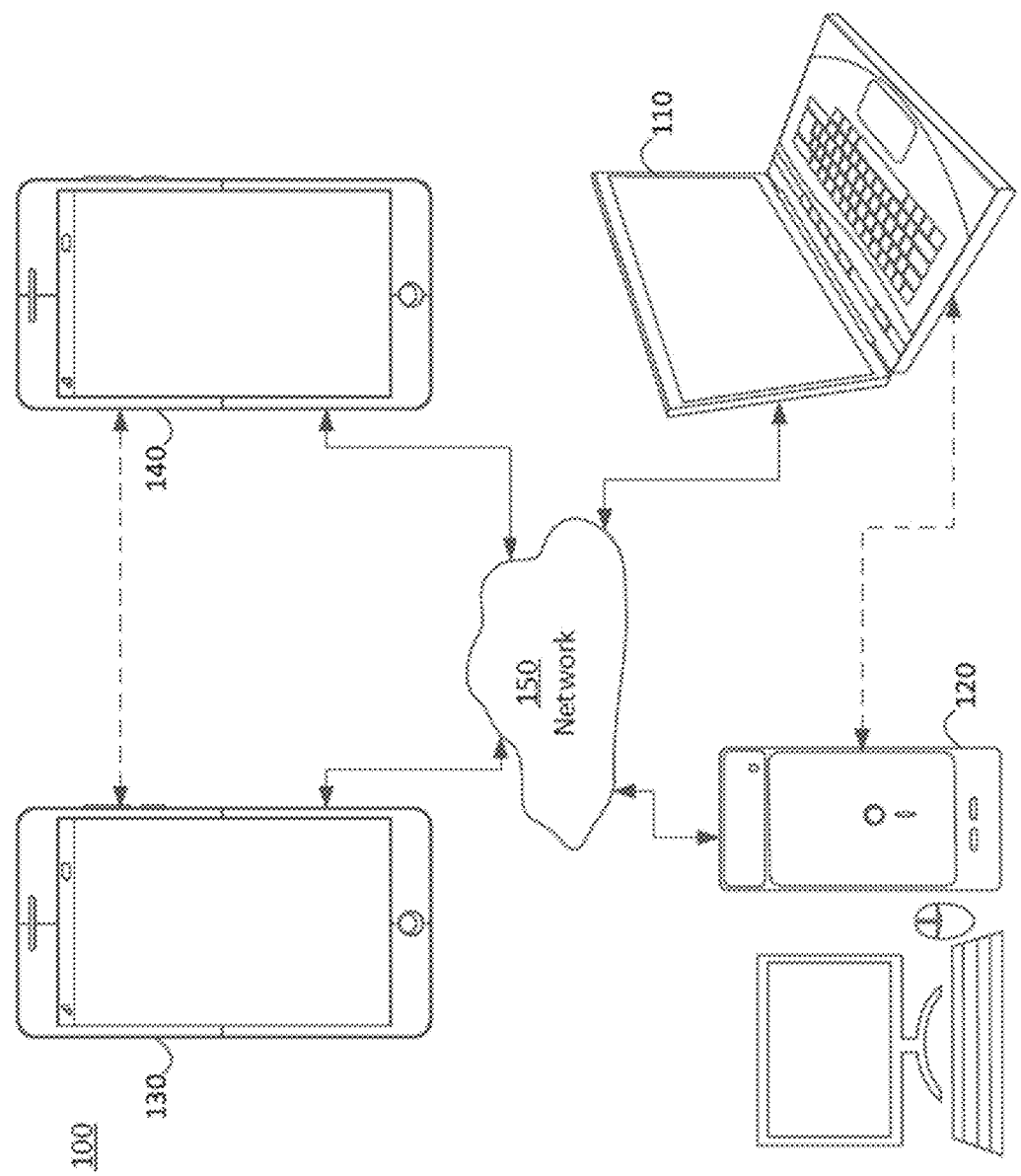
FIG. 1 is a schematic illustration of a simplified block diagram of a communication system in accordance with an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of some embodiments may be incorporated into or combined with some embodiments (or one or more features of some embodiments). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "some embodiments," "an embodiment," or similar language means that a particular feature, structure, or characteristic described in connection with the indicated embodiment is included in at least some embodiments of the present solution. Thus, the phrases "in some embodiments", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

The disclosed methods may be used separately or combined in any order. Further, the disclosed methods may be implemented by processing circuitry (e.g., one or more processors or one or more integrated circuits). In one example, the one or more processors execute a program that is stored in a non-transitory computer-readable medium.

Interprediction in VVC:

For each inter-predicted CU, motion parameters consisting of motion vectors, reference picture indices and reference picture list usage index, and additional information needed for the new coding feature of VVC is used for inter-predicted sample generation. The motion parameter may be signaled in an explicit or implicit manner. When a CU is coded with skip mode, the CU is associated with one PU and has no significant residual coefficients, no coded motion vector delta or reference picture index. A merge mode is specified whereby the motion parameters for the current CU are obtained from neighboring CUs, including spatial and temporal candidates, and additional schedules introduced in VVC. The merge mode may be applied to any inter-predicted CU, not only for skip mode. The alternative to the merge mode is the explicit transmission of motion parameters, where motion vector, corresponding reference picture index for each reference picture list and reference picture list usage flag and other needed information are signaled explicitly per each CU.

In VVC, the VTM reference software includes a number of new and refined inter prediction coding tools listed as follows:

Extended merge prediction
Merge motion vector difference (MMVD)
AMVP mode with symmetric MVD signalling
Affine motion compensated prediction
Subblock-based temporal motion vector prediction (SbTMVP)
Adaptive motion vector resolution (AMVR)
Motion field storage: $\frac{1}{16}^{th}$ luma sample MV storage and 8×8 motion field compression
Bi-prediction with CU-level weights (BCW)
Bi-directional optical flow (BDOF)
Decoder side motion vector refinement (DMVR)
Combined inter and intra prediction (CIIP)
Geometric partitioning mode (GPM)

The following text provide details about inter predictions and related methods.

In VTM4, the merge candidate list is constructed by including the following five types of candidates in order:

Spatial MVP from spatial neighbour CUs
Temporal MVP from collocated CUs
History-based MVP from an FIFO table
Pairwise average MVP
Zero MVs.

The size of the merge list is signalled in a slice header and the maximum allowed size of merge list is 6 in VTM4. For each CU code in merge mode, an index of a best merge candidate is encoded using truncated unary binarization (TU). The first bin of the merge index is coded with context and bypass coding is used for other bins.

The generation process of each category of merge candidates is provided in this session.

Figure 5:
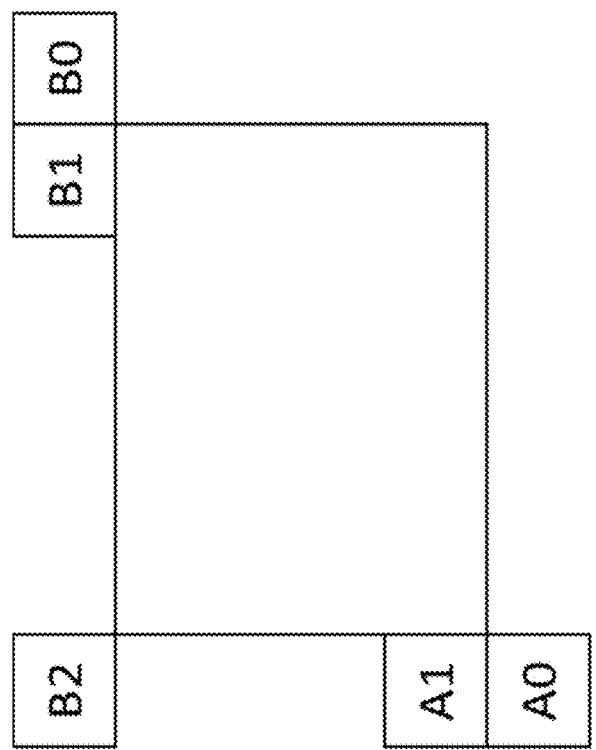
FIG. 5 is an example of positions of spatial merge candidate in accordance with an embodiment.
Figure 6:
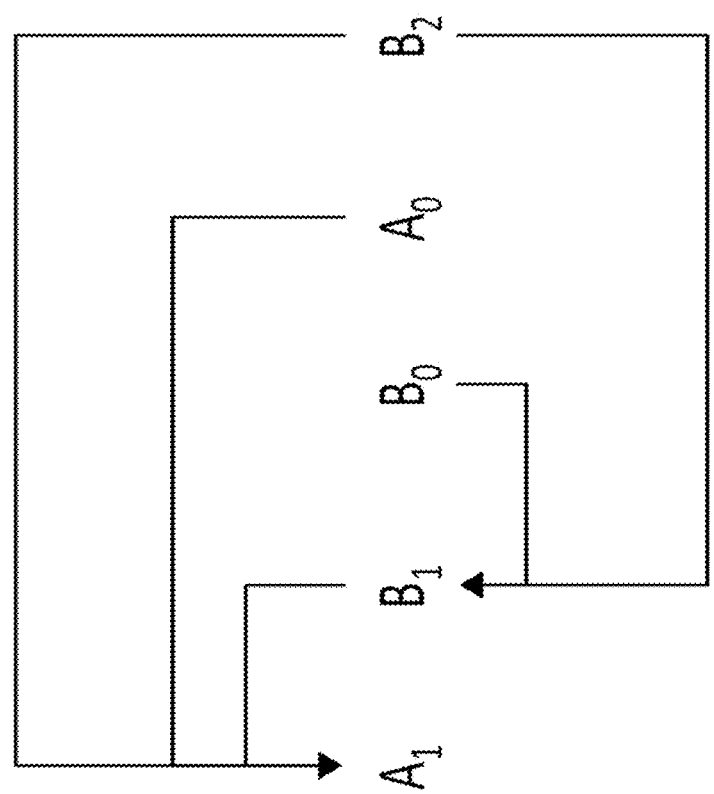
FIG. 6 is an example of candidate pairs considered for redundancy check of spatial merge candidates in accordance with an embodiment.

The derivation of spatial merge candidates in VVC is same to that in HEVC. A maximum of four merge candidates are selected among candidates located in the positions depicted in FIG. 5. The order of derivation is $B_1, A_1, B_0, A_0$, and $B_2$. Position $B_2$ is considered only when any CU of position $A_0, B_0, B_1, A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 6 are considered and a candidate is only added to the list if the corresponding candidate used for redundancy check has not the same motion information.

Figure 7:
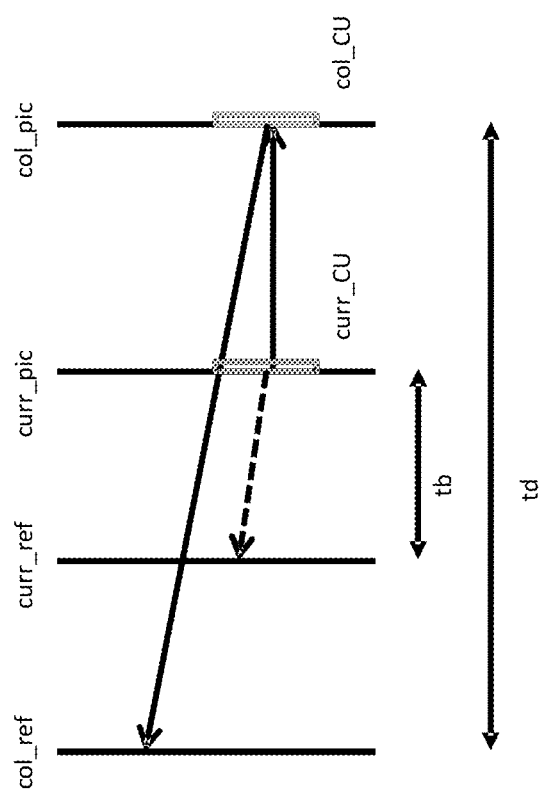
FIG. 7 is an example of motion vector scaling for temporal merge candidate in accordance with an embodiment.

In this operation, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 7, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 8:
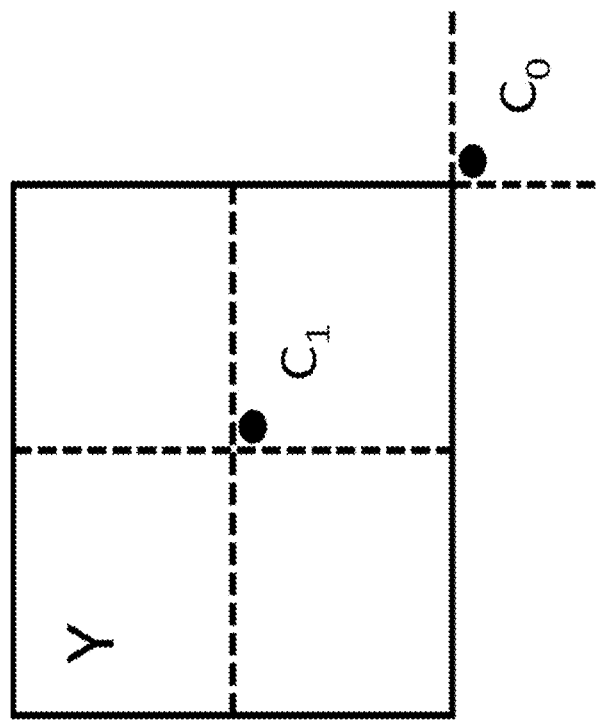
FIG. 8 is an example of Candidate positions for temporal merge candidate, C0 and C1 in accordance with an embodiment.

The position for the temporal candidate is selected between candidates $C_0$ and $C_1$, as depicted in FIG. 8. If CU at position $C_0$ is not available, is intra coded, or is outside of the current row of CTUs, position $C_1$ is used. Otherwise, position $C_0$ is used in the derivation of the temporal merge candidate.

Figure 9B:
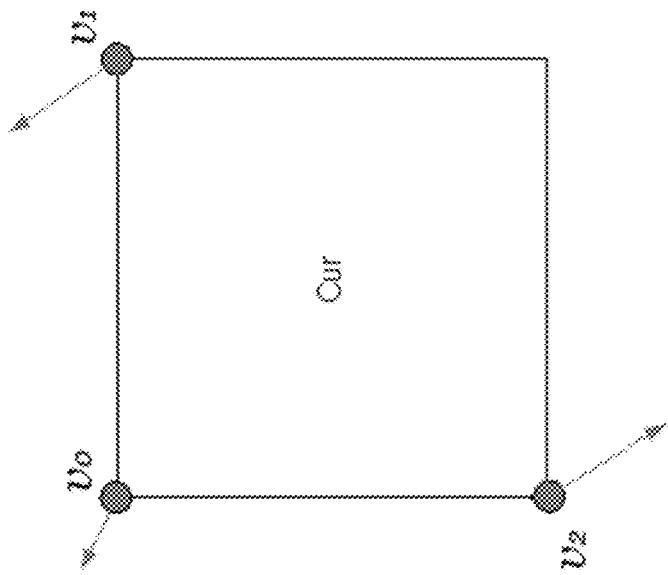
FIG. 9B is an example of an affine motion field of a block in accordance with an embodiment.
Figure 9A:
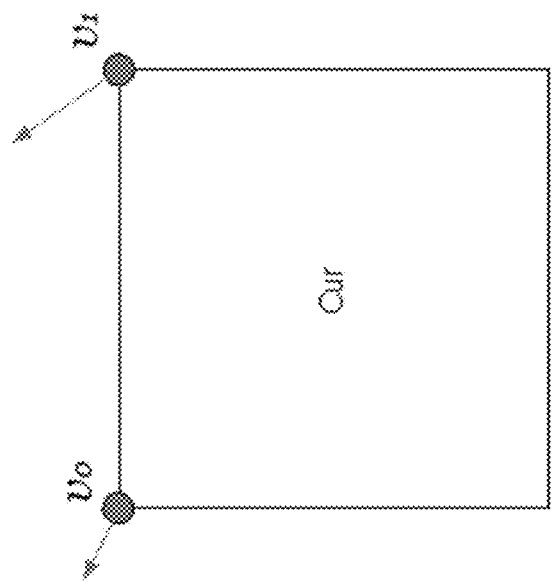
FIG. 9A is an example of an affine motion field of a block in accordance with an embodiment.

In HEVC, only translation motion model is applied for motion compensation prediction (MCP). While in the real world, there are many kinds of motion, e.g. zoom in/out, rotation, perspective motions and the other irregular motions. In current VTM, a block-based affine transform motion compensation prediction is applied. As shown FIG. 9A and FIG. 9B, the affine motion field of the block is described by motion information of two control point (4-parameter) or three control point motion vectors (6-parameter).

For 4-parameter affine motion model, motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1x} - mv_{0x}}{W}y + mv_{0y} \end{cases} \quad (1)$$

Which may also be described as $$\begin{cases} mv_x = ax + by + c \\ mv_y = -bx + ay + f \end{cases} \quad (2)$$

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad (3)$$

Which may also be described as $$\begin{cases} mv_x = ax + by + c \\ mv_y = dx + ey + f \end{cases} \quad (4)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 10:
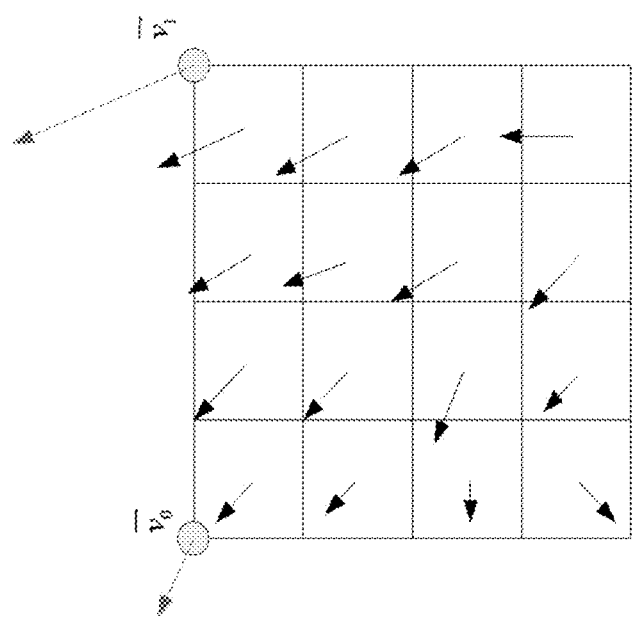
FIG. 10 is an example of an affine motion vector field of a block in accordance with an embodiment.

In order to simplify the motion compensation prediction, block based affine transform prediction is applied. To derive motion vector of each 4×4 luma sub-block, the motion vector of the center sample of each sub-block, as shown in FIG. 10, is calculated according to above equations, and rounded to 1/16 fraction accuracy. Then the motion compensation interpolation filters are applied to generate the prediction of each sub-block with derived motion vector. The sub-block size of chroma-components is also set to be 4×4. The MV of a 4×4 chroma sub-block is calculated as the average of the MVs of the four corresponding 4×4 luma sub-blocks.

As done for translational motion inter prediction, there are also two affine motion inter prediction modes: affine merge mode and affine AMVP mode.

Figure 11:
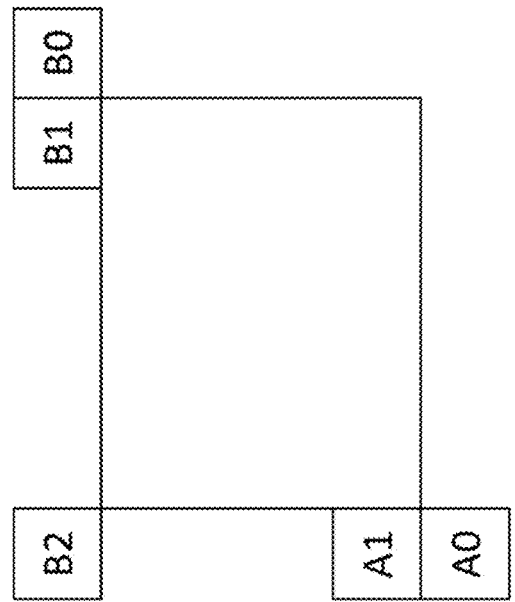
FIG. 11 is an example of positions of spatial merge candidate in accordance with an embodiment.
Figure 12:
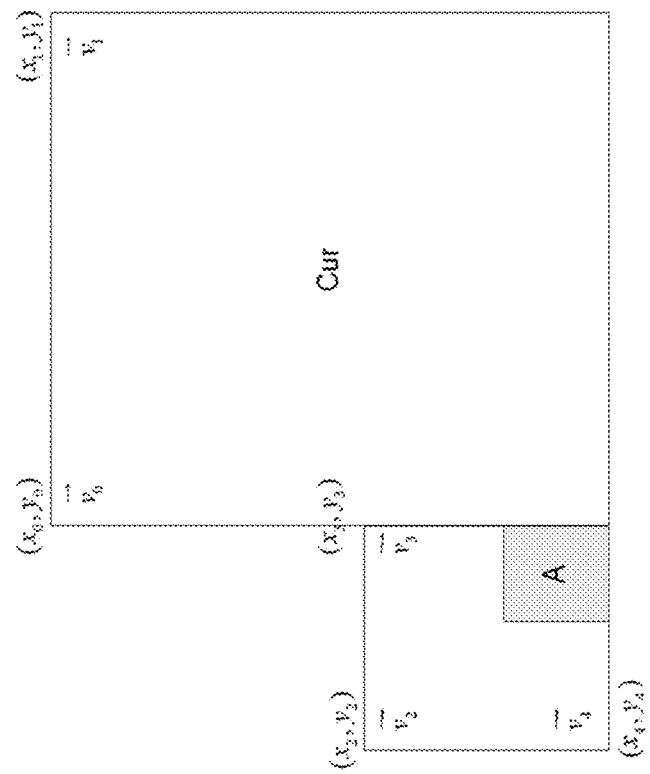
FIG. 12 is an example of control point motion vector inheritance in accordance with an embodiment.

AF_MERGE mode may be applied for CUs with both width and height larger than or equal to 8. In this mode the CPMVs of the current CU is generated based on the motion information of the spatial neighboring CUs. There may be up to five CPMVP candidates and an index is signalled to indicate the one to be used for the current CU. The following three types of CPVM candidate are used to form the affine merge candidate list:

Inherited affine merge candidates that extrapolated from the CPMVs of the neighbour CUs Constructed affine merge candidates CPMVPs that are derived using the translational MVs of the neighbour CUs Zero MVs In VTM3, there are maximum two inherited affine candidates, which are derived from affine motion model of the neighboring blocks, one from left neighboring CUs and one from above neighboring CUs. The candidate blocks are shown in FIG. 11. For the left predictor, the scan order is A0->A1, and for the above predictor, the scan order is B0->B1->B2. Only the first inherited candidate from each side is selected. No pruning check is performed between two inherited candidates. When a neighboring affine CU is identified, its control point motion vectors are used to derive the CPMVP candidate in the affine merge list of the current CU. As shown in FIG. 12, if the neighbour left bottom block A is coded in affine mode, the motion vectors $v_2$, $v_3$ and $v_4$ of the top left corner, above right corner and left bottom corner of the CU which contains the block A are attained. When block A is coded with 4-parameter affine model, the two CPMVs of the current CU are calculated according to $v_2$, and $v_3$. In case that block A is coded with 6-parameter affine model, the three CPMVs of the current CU are calculated according to $v_2$, $v_3$ and $v_4$.

Constructed affine candidate means the candidate is constructed by combining the neighbor translational motion information of each control point. The motion information for the control points is derived from the specified spatial neighbors and temporal neighbor shown in FIG. 13. $CPMV_k$ (k=1, 2, 3, 4) represents the k-th control point. For $CPMV_1$, the B2->B3->A2 blocks are checked and the MV of the first available block is used. For $CPMV_2$, the B1->B0 blocks are checked and for $CPMV_3$, the A1->A0 blocks are checked. For TMVP is used as $CPMV_4$ if it's available.

After MVs of four control points are attained, affine merge candidates are constructed based on that motion information. The following combinations of control point MVs are used to construct in order:

{$CPMV_1$, $CPMV_2$, $CPMV_3$}, {$CPMV_1$, $CPMV_2$, $CPMV_4$}, {$CPMV_1$, $CPMV_3$, $CPMV_4$}, {$CPMV_2$, $CPMV_3$, $CPMV_4$}, {$CPMV_1$, $CPMV_2$}, {$CPMV_1$, $CPMV_3$}

The combination of 3 CPMVs constructs a 6-parameter affine merge candidate and the combination of 2 CPMVs constructs a 4-parameter affine merge candidate. To avoid motion scaling process, if the reference indices of control points are different, the related combination of control point MVs is discarded.

After inherited affine merge candidates and constructed affine merge candidate are checked, if the list is still not full, zero MVs are inserted to the end of the list.

Affine AMVP mode may be applied for CUs with both width and height larger than or equal to 16. An affine flag in CU level is signalled in the bitstream to indicate whether affine AMVP mode is used and then another flag is signaled to indicate whether 4-parameter affine or 6-parameter affine. In this mode, the difference of the CPMVs of current CU and their predictors CPMVPs is signalled in the bitstream. The affine AVMP candidate list size is 2 and it is generated by using the following four types of CPVM candidate in order:

Inherited affine AMVP candidates that extrapolated from the CPMVs of the neighbour CUs Constructed affine AMVP candidates CPMVPs that are derived using the translational MVs of the neighbour CUs Translational MVs from neighboring CUs Zero MVs The checking order of inherited affine AMVP candidates is same to the checking order of inherited affine merge candidates. The only difference is that, for AVMP candidate, only the affine CU that has the same reference picture as in current block is considered. No pruning process is applied when inserting an inherited affine motion predictor into the candidate list.

Figure 13:
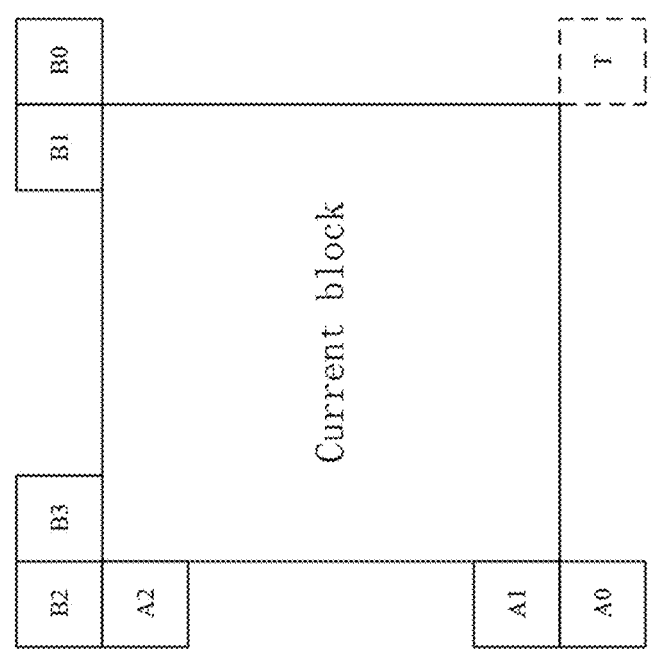
FIG. 13 is an example of locations of candidates position for constructed affine merge mode in accordance with an embodiment.

Constructed AMVP candidate is derived from the specified spatial neighbors shown in FIG. 13. The same checking order is used as done in affine merge candidate construction. In addition, reference picture index of the neighboring block is also checked. The first block in the checking order that is inter coded and has the same reference picture as in current CUs is used. There is only one When the current CU is coded with 4-parameter affine mode, and $mv_0$ and $mv_1$ are both available, they are added as one candidate in the affine AMVP list. When the current CU is coded with 6-parameter affine mode, and all three CPMVs are available, they are added as one candidate in the affine AMVP list. Otherwise, constructed AMVP candidate is set as unavailable.

If affine AMVP list candidates is still less than 2 after inherited affine AMVP candidates and Constructed AMVP candidate are checked, $mv_0$, $mv_1$ and $mv_2$ will be added, in order, as the translational MVs to predict all control point MVs of the current CU, when available. Finally, zero MVs are used to fill the affine AMVP list if it is still not full.

Subblock based affine motion compensation can save memory access bandwidth and reduce computation complexity compared to pixel based motion compensation, at the cost of prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, luma prediction sample is refined by adding a difference derived by the optical flow equation. The PROF is described as following four operations:

Operation 1) The subblock-based affine motion compensation is performed to generate subblock prediction I(i,j).

Operation 2) The spatial gradients $g_x(i,j)$ and $g_y(i,j)$ of the subblock prediction are calculated at each sample location using a 3-tap filter [−1, 0, 1]. The gradient calculation is exactly the same as gradient calculation in BDOF.

$$g_x(i,j)=(I(i+1,j)>>shift1)-(I(i-1,j)>>shift1) \quad (5)$$

$$g_y(i,j)=(I(i,j+1)>>shift1)-(I(i,j-1)>>shift1) \quad (6)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 14:
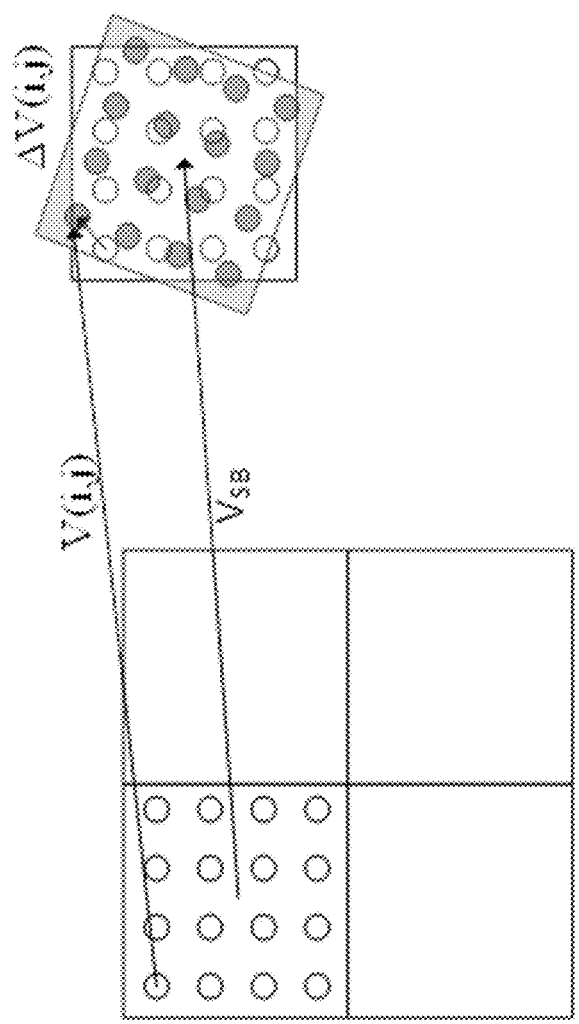
FIG. 14 is an example of a subblock with motion vectors in accordance with an embodiment.

Operation 3) The luma prediction refinement is calculated by the following optical flow equation.

$$\Delta I(i,j)=g_x(i,j)*\Delta v_x(i,j)+g_y(i,j)*\Delta v_y(i,j) \quad (7)$$

where the $\Delta v(i,j)$ is the difference between sample MV computed for sample location (i, j), denoted by v(i,j), and the subblock MV of the subblock to which sample (i, j) belongs, as shown in FIG. 14. The $\Delta v(i,j)$ is quantized in the unit of 1/32 luma sample precision.

Since the affine model parameters and the sample location relative to the subblock center are not changed from subblock to subblock, $\Delta v(i, j)$ may be calculated for the first subblock, and reused for other subblocks in the same CU. Let $dx(i,j)$ and $dy(i,j)$ be the horizontal and vertical offset from the sample location (i,j) to the center of the subblock $(x_{SB},y_{SB})$, $\Delta v(x,y)$ may be derived by the following equation, $$\begin{cases} dx(i,j) = i - x_{SB} \\ dy(i,j) = j - y_{SB} \end{cases} \quad (8)$$

$$\begin{cases} \Delta v_x(i,j) = C*dx(i,j) + D*dy(i,j) \\ \Delta v_y(i,j) = E*dx(i,j) + F*dy(i,j) \end{cases} \quad (9)$$

In order to keep accuracy, the enter of the subblock $(x_{SB}, y_{SB})$ is calculated as $((W_{SB}-1)/2, (H_{SB}-1)/2)$, where $W_{SB}$ and $H_{SB}$ are the subblock width and height, respectively.

For 4-parameter affine model, $$\begin{cases} C = F = \dfrac{v_{1x} - v_{0x}}{w} \\ E = -D = \dfrac{v_{1y} - v_{0y}}{w} \end{cases} \quad (10)$$

For 6-parameter affine model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (11)$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Operation 4) Finally, the luma prediction refinement $\Delta I(i,j)$ is added to the subblock prediction I(i,j). The final prediction I' is generated as the following equation.

$$I'(i,j)=I(i,j)+\Delta I(i,j)$$

PROF is not applied in two cases for an affine coded CU: 1) all control point MVs are the same, which indicates the CU only has translational motion; 2) the affine motion parameters are greater than a specified limit because the subblock based affine MC is degraded to CU based MC to avoid large memory access bandwidth requirement.

VVC supports the subblock-based temporal motion vector prediction (SbTMVP) method. Similar to the temporal motion vector prediction (TMVP) in HEVC, SbTMVP uses the motion field in the collocated picture to improve motion vector prediction and merge mode for CUs in the current picture. The same collocated picture used by TMVP is used for SbTVMP. SbTMVP differs from TMVP in the following two main aspects:

TMVP predicts motion at CU level but SbTMVP predicts motion at sub-CU level;

Whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 15A:
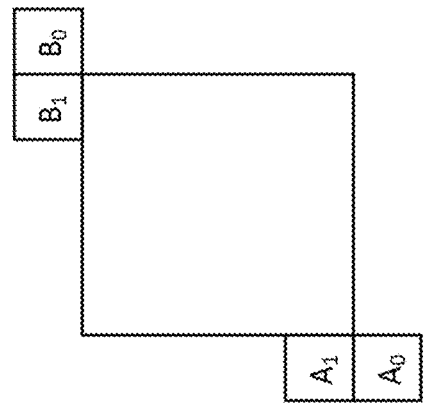
FIG. 15A is an example of spatial neighboring blocks used by ATVMP.
Figure 15B:
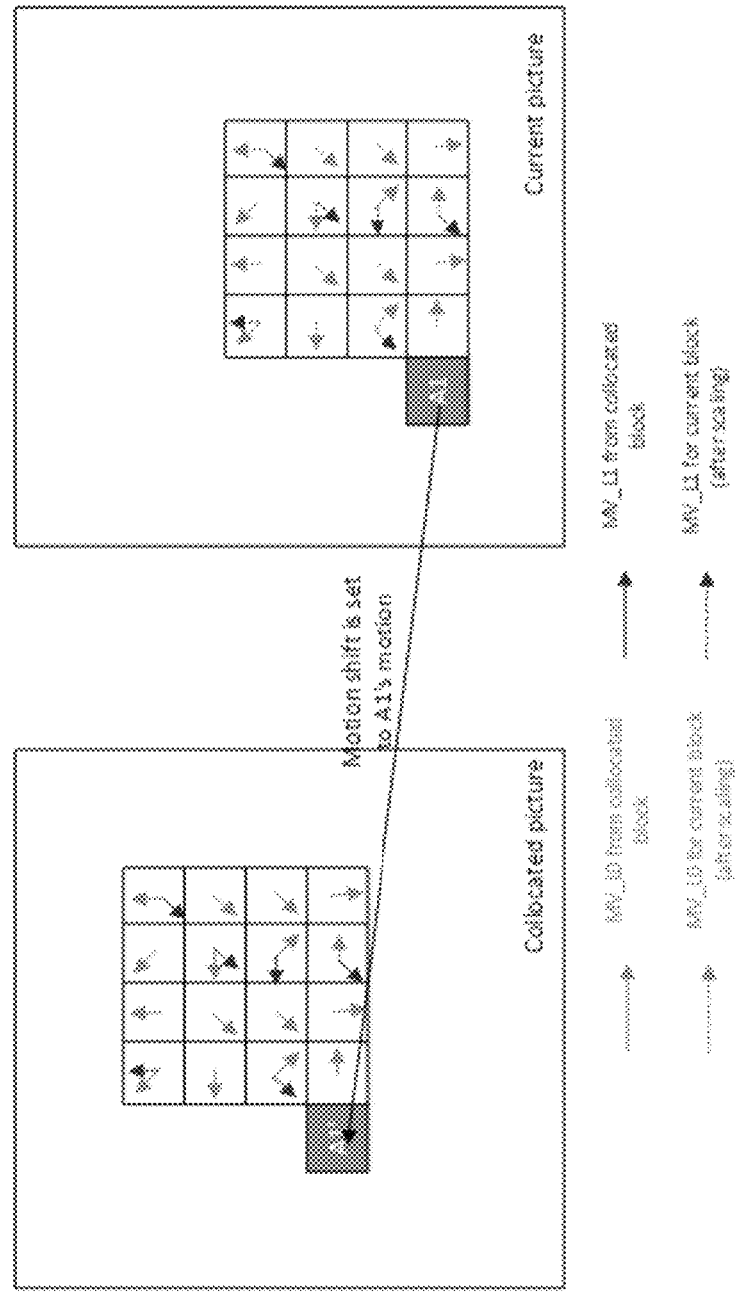
FIG. 15B is an example of the SbTMVP process in VVC in accordance with an embodiment.

The SbTVMP process is illustrated in FIG. 15A and FIG. 15B. SbTMVP predicts the motion vectors of the sub-CUs within the current CU in two operations. In the first operation, the spatial neighbor A1 in FIG. 15A is examined. If A1 has a motion vector that uses the collocated picture as its reference picture, this motion vector is selected to be the motion shift to be applied. If no such motion is identified, then the motion shift is set to (0, 0).

In the second operation, the motion shift identified in Operation 1 is applied (i.e. added to the current block's coordinates) to obtain sub-CU-level motion information (motion vectors and reference indices) from the collocated picture as shown in FIG. 15B. The example in FIG. 15B assumes the motion shift is set to block A1's motion. Then, for each sub-CU, the motion information of its corresponding block (the smallest motion grid that covers the center sample) in the collocated picture is used to derive the motion information for the sub-CU. After the motion information of the collocated sub-CU is identified, it is converted to the motion vectors and reference indices of the current sub-CU in a similar way as the TMVP process of HEVC, where temporal motion scaling is applied to align the reference pictures of the temporal motion vectors to those of the current CU.

In HEVC, the bi-prediction signal is generated by averaging two prediction signals obtained from two different reference pictures and/or using two different motion vectors. In VVC, the bi-prediction mode is extended beyond simple averaging to allow weighted averaging of the two prediction signals.

$$P_{bi\text{-}pred}=((8-w)*P_0+w*P_1+4)>>3 \quad (3\text{-}1)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

At the encoder, fast search algorithms are applied to find the weight index without significantly increasing the encoder complexity. These algorithms are summarized as follows. For further details readers are referred to the VTM software and document JVET-L0646. When combined with AMVR, unequal weights are only conditionally checked for 1-pel and 4-pel motion vector precisions if the current picture is a low-delay picture.

When combined with affine, affine ME will be performed for unequal weights if and only if the affine mode is selected as the current best mode.

When the two reference pictures in bi-prediction are the same, unequal weights are only conditionally checked.

Unequal weights are not searched when certain conditions are met, depending on the POC distance between current picture and its reference pictures, the coding QP, and the temporal level.

The BCW weight index is coded using one context coded bin followed by bypass coded bins. The first context coded bin indicates if equal weight is used; and if unequal weight is used, additional bins are signalled using bypass coding to indicate which unequal weight is used.

Weighted prediction (WP) is a coding tool supported by the H.264/AVC and HEVC standards to efficiently code video content with fading. Support for WP was also added into the VVC standard. WP allows weighting parameters (weight and offset) to be signalled for each reference picture in each of the reference picture lists L0 and L1. Then, during motion compensation, the weight(s) and offset(s) of the corresponding reference picture(s) are applied. WP and BCW are designed for different types of video content. In order to avoid interactions between WP and BCW, which will complicate VVC decoder design, if a CU uses WP, then the BCW weight index is not signalled, and w is inferred to be 4 (i.e. equal weight is applied). For a merge CU, the weight index is inferred from neighbouring blocks based on the merge candidate index. This may be applied to both normal merge mode and inherited affine merge mode. For constructed affine merge mode, the affine motion information is constructed based on the motion information of up to 3 blocks. The BCW index for a CU using the constructed affine merge mode is simply set equal to the BCW index of the first control point MV.

In VVC, CIIP and BCW cannot be jointly applied for a CU. When a CU is coded with CIP mode, the BCW index of the current CU is set to 2, e.g. equal weight.

The bi-directional optical flow (BDOF) tool is included in VVC. BDOF, previously referred to as BIO, was included in the JEM. Compared to the JEM version, the BDOF in VVC is a simpler version that requires much less computation, especially in terms of number of multiplications and the size of the multiplier.

BDOF is used to refine the bi-prediction signal of a CU at the 4×4 subblock level. BDOF is applied to a CU if it satisfies all the following conditions:

The CU is coded using "true" bi-prediction mode, i.e., one of the two reference pictures is prior to the current picture in display order and the other is after the current picture in display order The distances (i.e. POC difference) from two reference pictures to the current picture are same Both reference pictures are short-term reference pictures.

The CU is not coded using affine mode or the SbTMVP merge mode

CU has more than 64 luma samples

Both CU height and CU width are larger than or equal to 8 luma samples

BCW weight index indicates equal weight

WP is not enabled for the current CU

CIIP mode is not used for the current CU

BDOF is only applied to the luma component. As its name indicates, the BDOF mode is based on the optical flow concept, which assumes that the motion of an object is smooth. For each 4×4 subblock, a motion refinement $(v_x, v_y)$ is calculated by minimizing the difference between the L0 and L1 prediction samples. The motion refinement is then used to adjust the bi-predicted sample values in the 4×4 subblock. The following operations are applied in the BDOF process.

First, the horizontal and vertical gradients, $$\frac{\partial I^{(k)}}{\partial x}(i, j) \text{ and } \frac{\partial I^{(k)}}{\partial y}(i, j), k = 0,1,$$

of the two prediction signals are computed by directly calculating the difference between two neighboring samples, i.e., $$\frac{\partial I^{(k)}}{\partial x}(i, j) = \left(\left(I^{(k)}(i+1, j) \gg \text{shift1}\right) - \left(I^{(k)}(i-1, j) \gg \text{shift1}\right)\right) \quad (3\text{-}25)$$

$$\frac{\partial I^{(k)}}{\partial x}(i, j) = \left(\left(I^{(k)}(i, j+1) \gg \text{shift1}\right) - \left(I^{(k)}(i, j-1) \gg \text{shift1}\right)\right)$$

where $I^{(k)}(i,j)$ are the sample value at coordinate (i,j) of the prediction signal in list k, k=0,1, and shift1 is calculated based on the luma bit depth, bitDepth, as shift1=max(6, bitDepth−6).

Then, the auto- and cross-correlation of the gradients, $S_1$, $S_2$, $S_3$, $S_5$ and $S_6$, are calculated as $$S_1 = \sum_{(i,j) \in \Omega} \text{Abs}(\psi_x(i, j)), \quad (3\text{-}26)$$

$$S_3 = \sum_{(i,j) \in \Omega} \theta(i, j) \cdot \text{Sign}(\psi_x(i, j))$$

$$S_2 = \sum_{(i,j) \in \Omega} \psi_x(i, j) \cdot \text{Sign}(\psi_y(i, j))$$

$$S_5 = \sum_{(i,j) \in \Omega} \text{Abs}(\psi_y(i, j)),$$

$$S_6 = \sum_{(i,j) \in \Omega} \theta(i, j) \cdot \text{Sign}(\psi_y(i, j)) \text{ where}$$

$$\psi_x(i, j) = \left(\frac{\partial I^{(1)}}{\partial x}(i, j) + \frac{\partial I^{(0)}}{\partial x}(i, j)\right) \gg n_a \quad (3\text{-}27)$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) \gg n_b\right) - \left(I^{(0)}(i, j) \gg n_b\right)$$

where $\Omega$ is a 6×6 window around the 4×4 subblock, and the values of $n_a$ and $n_b$ are set equal to min(1, bitDepth−11) and min(4, bitDepth−8), respectively.

The motion refinement $(v_x, v_y)$ is then derived using the cross- and auto-correlation terms using the following:

$$v_x = S_1 > 0 ? \text{clip3}(-th'_{BIO}, th'_{BIO}, -((S_3 \cdot 2^{n_b - n_a}) \gg \lfloor \log_2 S_1 \rfloor)) : 0$$

$$v_y = S_5 > 0 ? \text{clip3}(-th'_{BIO}, th'_{BIO}, -((S_6 \cdot 2^{n_b - n_a} - ((v_x S_{2,m}) \ll n_{s_2} + v_x S_{2,s})/2) \gg \lfloor \log_2 S_5 \rfloor)) : 0 \quad (3\text{-}28)$$

where $S_{2,m} = S_2 \gg n_{s_2}$, $S_{2,s} = S_2 \& (2^{n_{s_2}} - 1)$, $th'_{BIO} = 2^{\max(5, BD-7)}$. $\lfloor \cdot \rfloor$ is the floor operation, and $n_{s_2} = 12$.

Based on the motion refinement and the gradients, the following adjustment is calculated for each sample in the 4×4 subblock:

$$b(x, y) = \text{rnd} \left( \left( v_x \left( \frac{\partial I^{(1)}(x, y)}{\partial x} - \frac{\partial I^{(0)}(x, y)}{\partial x} \right) + v_y \left( \frac{\partial I^{(1)}(x, y)}{\partial y} - \frac{\partial I^{(0)}(x, y)}{\partial y} \right) + 1 \right) / 2 \right) \quad (3\text{-}29)$$

Finally, the BDOF samples of the CU are calculated by adjusting the bi-prediction samples as follows:

$$\text{pred}_{BDOF}(x,y) = (I^{(0)}(x,y) + I^{(1)}(x,y) + b(x,y) + o_{\text{offset}}) \gg \text{shift} \quad (3\text{-}30)$$

These values are selected such that the multipliers in the BDOF process do not exceed 15-bit, and the maximum bit-width of the intermediate parameters in the BDOF process is kept within 32-bit.

Figure 16:
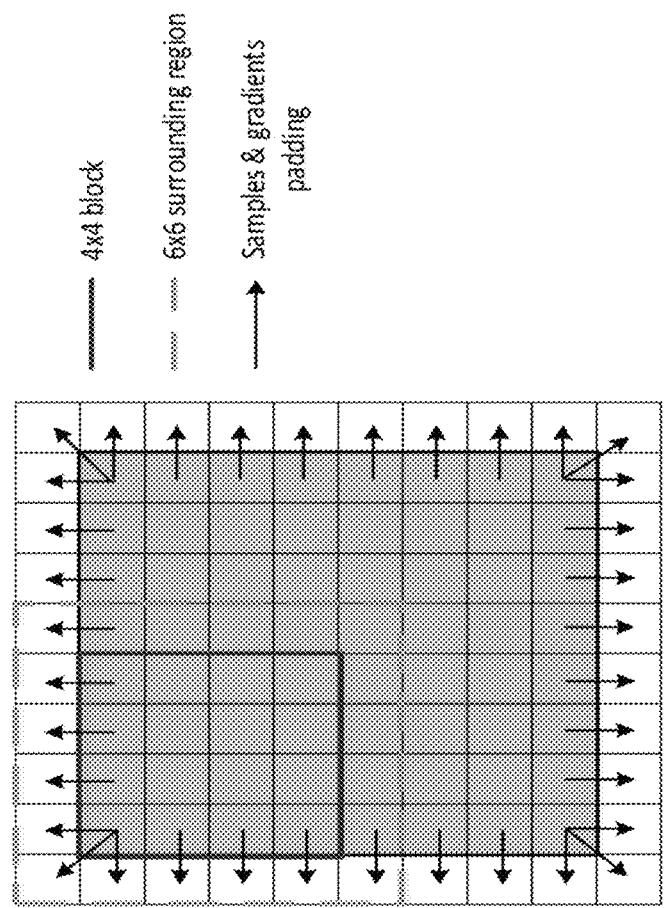
FIG. 16 is an example of an extended CU region used in BDOF in accordance with an embodiment.

In order to derive the gradient values, some prediction samples $I^{(k)}(i,j)$ in list k (k=0,1) outside of the current CU boundaries need to be generated. As depicted in FIG. 16, the BDOF in VVC uses one extended row/column around the CU's boundaries. In order to control the computational complexity of generating the out-of-boundary prediction samples, prediction samples in the extended area (white positions) are generated by taking the reference samples at the nearby integer positions (using floor( ) operation on the coordinates) directly without interpolation, and the normal 8-tap motion compensation interpolation filter is used to generate prediction samples within the CU (gray positions). These extended sample values are used in gradient calculation only. For the remaining operations in the BDOF process, if any sample and gradient values outside of the CU boundaries are needed, they are padded (i.e. repeated) from their nearest neighbors.

When the width and/or height of a CU are larger than 16 luma samples, it will be split into subblocks with width and/or height equal to 16 luma samples, and the subblock boundaries are treated as the CU boundaries in the BDOF process. The maximum unit size for BDOF process is limited to 16×16. For each subblock, the BDOF process could skipped. When the SAD of between the initial L0 and L1 prediction samples is smaller than a threshold, the BDOF process is not applied to the subblock. The threshold is set equal to (8*W*(H>>1), where W indicates the subblock width, and H indicates subblock height. To avoid the additional complexity of SAD calculation, the SAD between the initial L0 and L1 prediction samples calculated in DVMR process is re-used here.

If BCW is enabled for the current block, i.e., the BCW weight index indicates unequal weight, then bi-directional optical flow is disabled. Similarly, if WP is enabled for the current block, i.e., the luma_weight_lx_flag is 1 for either of the two reference pictures, then BDOF is also disabled. When a CU is coded with symmetric MVD mode or CIIP mode, BDOF is also disabled.

Figure 17:
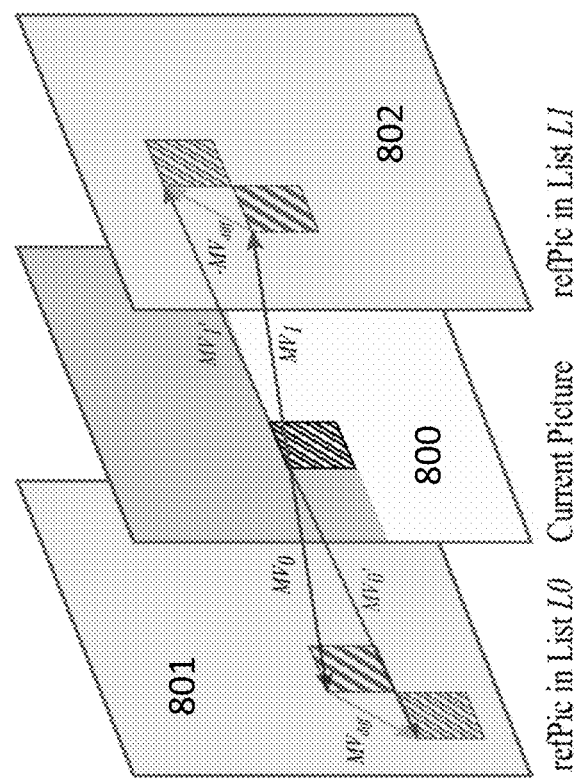
FIG. 17 is an example of decoding side motion vector refinement in accordance with an embodiment.

In order to increase the accuracy of the MVs of the merge mode, a bilateral-matching (BM) based decoder side motion vector refinement is applied in VVC. In bi-prediction operation, a refined MV is searched around the initial MVs in the reference picture list L0 and reference picture list L1. The BM method calculates the distortion between the two candidate blocks in the reference picture list L0 and list L1. As illustrated in FIG. 17, the SAD between the red blocks based on each MV candidate around the initial MV is calculated. The MV candidate with the lowest SAD becomes the refined MV and used to generate the bi-predicted signal.

In VVC, the application of DMVR is restricted and is only applied for the CUs which are coded with following modes and features:

CU level merge mode with bi-prediction MV

One reference picture is in the past and another reference picture is in the future with respect to the current picture The distances (i.e. POC difference) from two reference pictures to the current picture are same Both reference pictures are short-term reference pictures CU has more than 64 luma samples Both CU height and CU width are larger than or equal to 8 luma samples BCW weight index indicates equal weight WP is not enabled for the current block CIIP mode is not used for the current block The refined MV derived by DMVR process is used to generate the inter prediction samples and also used in temporal motion vector prediction for future pictures coding. While the original MV is used in deblocking process and also used in spatial motion vector prediction for future CU coding.

The additional features of DMVR are mentioned in the following sub-clauses.

In DVMR, the search points are surrounding the initial MV and the MV offset obey the MV difference mirroring rule. In other words, any points that are checked by DMVR, denoted by candidate MV pair (MV0, MV1) obey the following two equations:

$$MV0'=MV0+MV\_offset \quad (3\text{-}2)$$

$$MV1'=MV1-MV\_offset \quad (3\text{-}3)$$

Where MV_offset represents the refinement offset between the initial MV and the refined MV in one of the reference pictures. The refinement search range is two integer luma samples from the initial MV. The searching includes the integer sample offset search stage and fractional sample refinement stage.

25 points full search is applied for integer sample offset searching. The SAD of the initial MV pair is first calculated. If the SAD of the initial MV pair is smaller than a threshold, the integer sample stage of DMVR is terminated. Otherwise SADs of the remaining 24 points are calculated and checked in raster scanning order. The point with the smallest SAD is selected as the output of integer sample offset searching stage. To reduce the penalty of the uncertainty of DMVR refinement, it is disclosed to favor the original MV during the DMVR process. The SAD between the reference blocks referred by the initial MV candidates is decreased by ¼ of the SAD value.

The integer sample search is followed by fractional sample refinement. To save the calculation complexity, the fractional sample refinement is derived by using parametric error surface equation, instead of additional search with SAD comparison. The fractional sample refinement is conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form $$E(x,y)=A(x-x_{min})^2+B(y-y_{min})^2+C \quad (3\text{-}4)$$

where ($x_{min}$, $y_{min}$) corresponds to the fractional position with the least cost and C corresponds to the minimum cost value. By solving the above equations by using the cost value of the five search points, the ($x_{min}$, $y_{min}$) is computed as:

$$x_{min}=(E(-1,0)-E(1,0))/(2(E(-1,0)+E(1,0)-2E(0,0))) \quad (3\text{-}5)$$

$$y_{min}=(E(0,-1)-E(0,1))/(2((E(0,-1)+E(0,1)-2E(0,0))) \quad (3\text{-}6)$$

The value of $x_{min}$ and $y_{min}$ are automatically constrained to be between −8 and 8 since all cost values are positive and the smallest value is E(0,0). This corresponds to half peal offset with 1/16th-pel MV accuracy in VVC. The computed fractional ($x_{min}$, $y_{min}$) are added to the integer distance refinement MV to get the sub-pixel accurate refinement delta MV.

In VVC, the resolution of the MVs is 1/16 luma samples. The samples at the fractional position are interpolated using a 8-tap interpolation filter. In DMVR, the search points are surrounding the initial fractional-pel MV with integer sample offset, therefore the samples of those fractional position need to be interpolated for DMVR search process. To reduce the calculation complexity, the bi-linear interpolation filter is used to generate the fractional samples for the searching process in DMVR. Another important effect is that by using bi-linear filter is that with 2-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

When the width and/or height of a CU are larger than 16 luma samples, it will be further split into subblocks with width and/or height equal to 16 luma samples. The maximum unit size for DMVR searching process is limit to 16×16.

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m$×$2^n$ with m, n∈{3 . . . 6} excluding 8×64 and 64×8.

Figure 18:
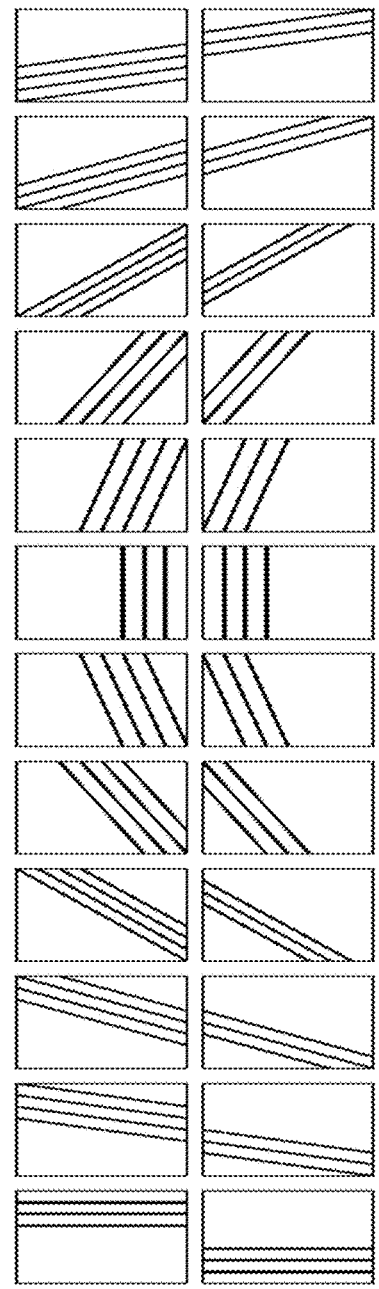
FIG. 18 is an example of GPM splits grouped by identical angles in accordance with an embodiment.

When this mode is used, a CU is split into two parts by a geometrically located straight line (FIG. 18). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in 2.1.6.1.

If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights as in 2.1.6.2. This is the prediction signal for the whole CU, and transform and quantization process will be applied to the whole CU as in other prediction modes. Finally, the motion field of a CU predicted using the geometric partition modes is stored as in 2.1.6.3.

Figure 19:
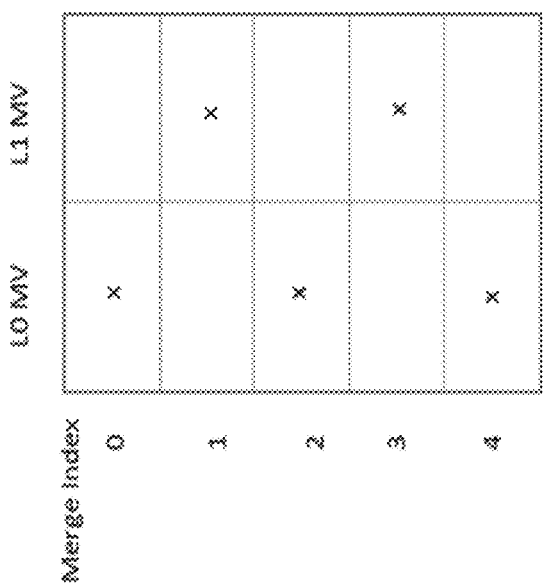
FIG. 19 is an example of uni-prediction motion vector selection for geometric portioning mode in accordance with an embodiment.

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 19. In case a corresponding LX motion vector of the n-the extended merge candidate does not exist, the L(1−X) motion vector of the same candidate is used instead as the uni-prediction motion vector for geometric partitioning mode.

After predicting each part of a geometric partition using its own motion, blending is applied to the two prediction signals to derive samples around geometric partition edge. The blending weight for each position of the CU are derived based on the distance between individual position and the partition edge.

The distance for a position (x, y) to the partition edge are derived as:

$$d(x, y) = (2x + 1 - w)\cos(\varphi_i) + (2y + 1 - h)\sin(\varphi_i) - \rho_j \quad (3-7)$$

$$\rho_j = \rho_{x,j}\cos(\varphi_i) + \rho_{y,j}\sin(\varphi_i) \quad (3-8)$$

$$\rho_{x,j} = \begin{cases} 0 & i \% 16 = 8 \text{ or } (i \% 16 \neq 0 \text{ and } h \geq w) \\ \pm(j \times w) \gg 2 & \text{otherwise} \end{cases} \quad (3-9)$$

$$\rho_{x,j} = \begin{cases} \pm(j \times h) \gg 2 & i \% 16 = 8 \text{ or } (i \% 16 \neq 0 \text{ and } h \geq w) \\ 0 & \text{otherwise} \end{cases} \quad (3-10)$$

where i,j are the indices for angle and offset of a geometric partition, which depend on the signaled geometric partition index. The sign of $p_{x,j}$ and $\rho_{y,j}$ depend on angle index i.

The weights for each part of a geometric partition are derived as following:

$$wIdxL(x, y) = partIdx ? 32 + d(x, y) : 32 - d(x, y) \quad (3-11)$$

$$w_0(x, y) = \frac{\text{Clip3}(0,8,(wIdxL(x, y) + 4) \gg 3)}{8} \quad (3-12)$$

$$w_1(x, y) = 1 - w_0(x, y) \quad (3-13)$$

Figure 20:
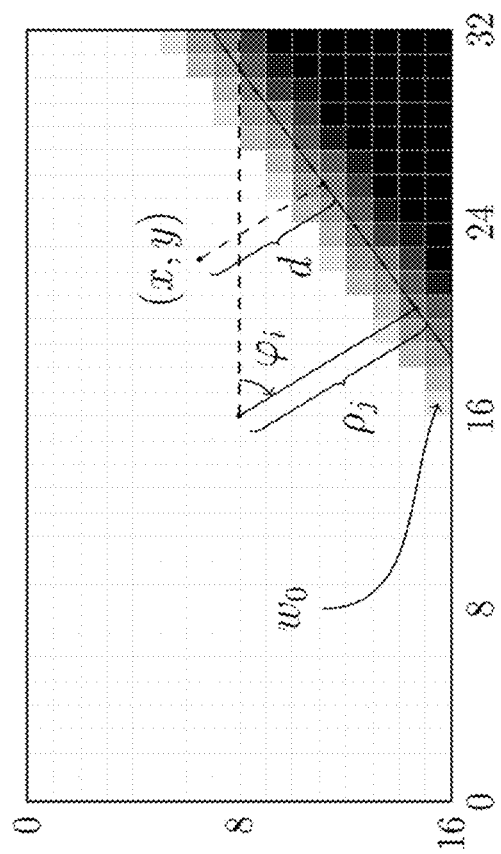
FIG. 20 is an example of generation of a bending weight using geometric partitioning mode in accordance with an embodiment.

The part Idx depends on the angle index i. One example of weigh $w_0$ is illustrated in FIG. 20.

Mv1 from the first part of the geometric partition, Mv2 from the second part of the geometric partition and a combined Mv of Mv1 and Mv2 are stored in the motion filed of a geometric partitioning mode coded CU.

The stored motion vector type for each individual position in the motion filed are determined as:

sType=abs(motionIdx)<32?2:(motionIdx≤0?(1−partIdx):partIdx) (3-43)

where motion Idx is equal to d(4x+2, 4y+2), which is recalculated from equation (3-36). The partIdx depends on the angle index i.

If sType is equal to 0 or 1, Mv0 or Mv1 are stored in the corresponding motion field, otherwise if sType is equal to 2, a combined Mv from Mv0 and Mv2 are stored. The combined Mv are generated using the following process:

If Mv1 and Mv2 are from different reference picture lists (one from L0 and the other from L1), then Mv1 and Mv2 are simply combined to form the bi-prediction motion vectors.

Otherwise, if Mv1 and Mv2 are from the same list, only uni-prediction motion Mv2 is stored.

The video coding standards HEVC and AVC/H.264 use a fixed motion vector resolution of quarter luma sample. However, it is well-known that an optimum trade-off between displacement vector rate and prediction error rate has to be chosen to achieve overall rate-distortion optimality. VVC allows to select the motion vector resolution at coding block level and, therefore, to trade-off bit rate versus fidelity for the signaling of the motion parameters. This is enabled by the AMVR mode. The AMVR mode is signaled at the coding block level if at least one component of an MVD is not equal to zero. The motion vector predictor is rounded to the given resolution such that the resulting motion vector is guaranteed to fall on a grid of the given resolution. For each given resolution, the corresponding AmvrShift value in Table 1 is also defined to specify the resolution of the motion vector difference with the left shifting operation with AmvrShift-bit. The given motion vector differences, denoted as MvdL0 and MvdL1 in AMVP mode and MvdCpL0, and MvdCpL1 in affine AMVP mode, are modified as follows when AMVR mode is enable.

Out of Boundary Constraint of Inter Bi-Prediction:

The constraint on the inter bi-prediction coding mode may be applied on bi-prediction when certain reference samples used in motion compensation are out of picture boundaries.

In one example, when a current pixel with bi-prediction motion vectors has motion vector on one of the two reference lists pointing to a position which is beyond a threshold of distance out of the picture boundary, the motion vector for that reference list is considered out of boundary, and the inter prediction is changed to uni-prediction. Only the motion vector for the other reference list which is not out of boundary will be used for the uni-prediction. In some methods, when MVs for both reference lists are out of boundary, bi-prediction is not constrained.

In another example, the constraint on bi-prediction is applied at sub-block level. As depicted in FIG. 21, for each of the N×N sub-block within a coding block with inter Bi-prediction MVs, if the motion vectors on one of the reference lists is pointing out of the boundary of the reference picture beyond a threshold of M pixels, the sub-block may be changed to a uni-prediction mode, with only the MV on the reference list which is not pointing beyond the out of boundary threshold on the corresponding reference picture.

In some methods, the bi-prediction related tools maybe disabled or modified when bi-prediction is changed to uni-prediction due to out of boundary conditions. In one example, when the bi-prediction restriction is applied and uni-prediction is used BDOF may be disabled. Embodiments of the present disclosure adaptively apply the constraint on the bi-prediction mode to improve coding efficiency and/or quality.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
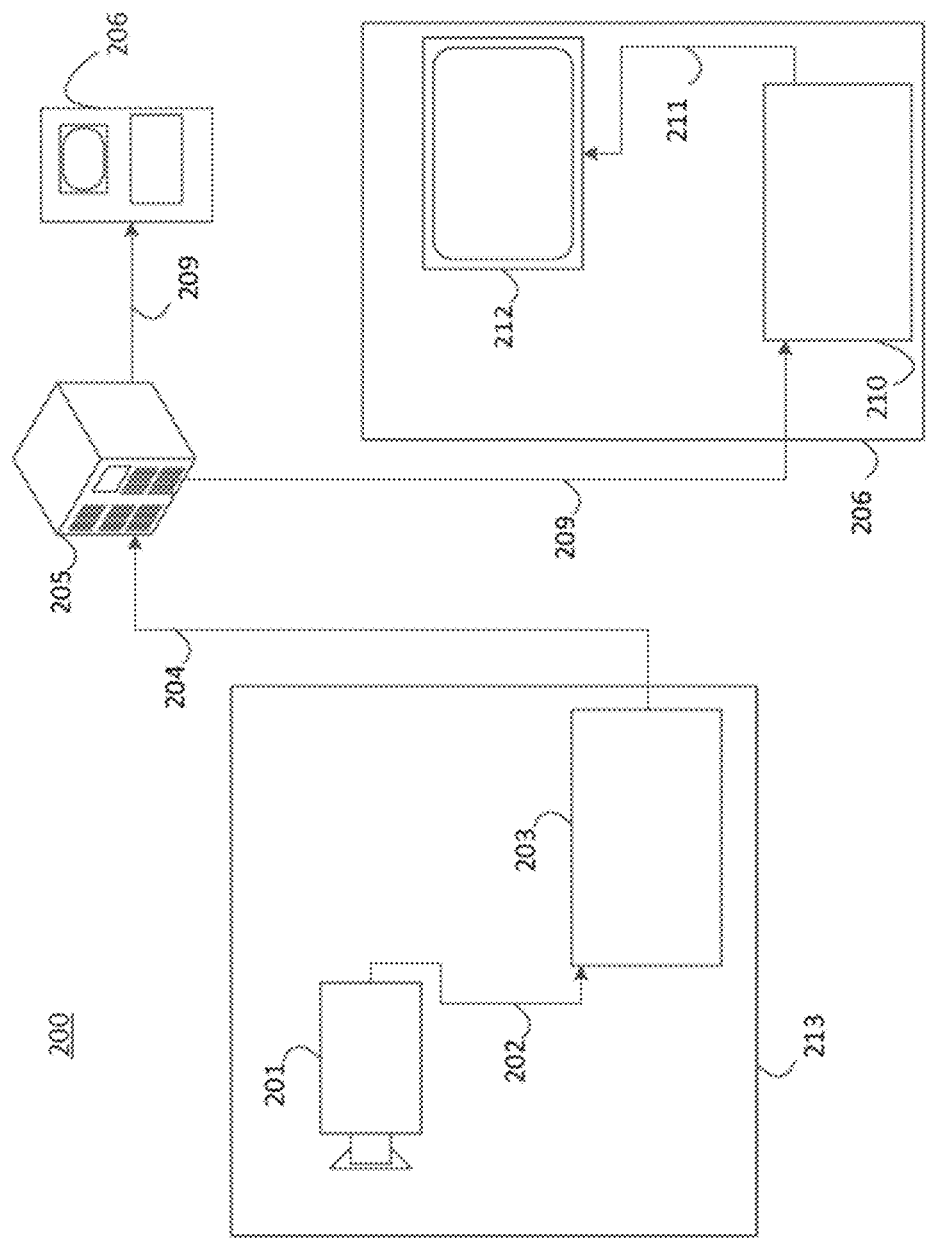
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter may be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and may be processed by the encoder (203) coupled to the camera (201). The encoder (203) can include hardware, software, or a combination thereof to enable or implement aspects of the disclosed subject matter as described in more detail below. The encoded video bitstream (204) may include a lower data volume when compared to the sample stream, and may be stored on a streaming server (205) for future use. One or more streaming clients (206) can access the streaming server (205) to retrieve video bit streams (209) that may be copies of the encoded video bitstream (204).

In embodiments, the streaming server (205) may also operation as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that may be rendered on the display (212) or another rendering device (not depicted). In some streaming systems, the video bitstreams (204, 209) may be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
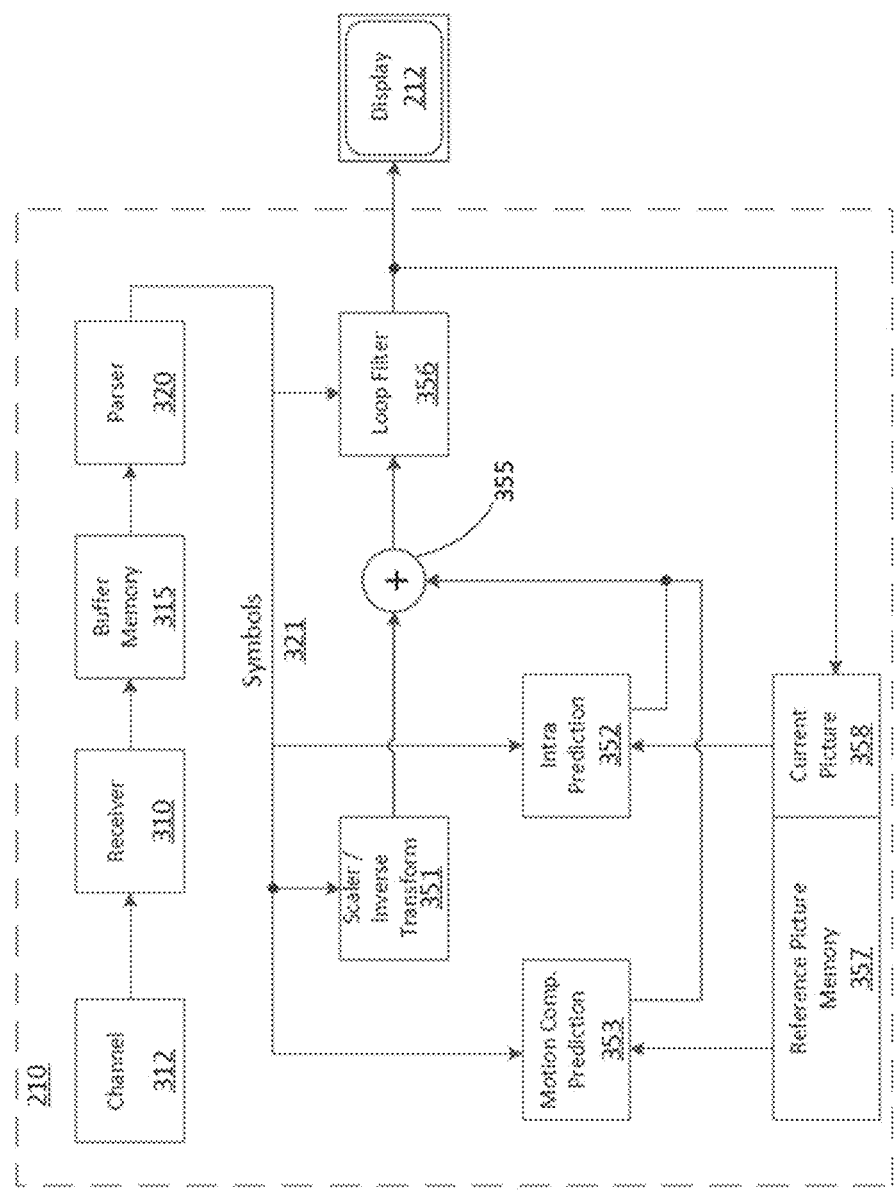
FIG. 3 is a schematic illustration of a simplified block diagram of a decoder in accordance with an embodiment.

FIG. 3 illustrates an example operational block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least some embodiments, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer (315) may not be used, or may be small. For use on best effort packet networks such as the Internet, the buffer (315) may be required, may be comparatively large, and may be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence may be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, may be controlled by the subgroup control information that was parsed from the coded video sequence by the parser (320). The flow of such subgroup control information between the parser (320) and the multiple units below is not depicted for clarity.

Beyond the operational blocks already mentioned, decoder (210) may be conceptually subdivided into a number of operational units as described below. In a practical implementation operating under commercial constraints, many of these units interact closely with each other and can, at least partly, be integrated into each other. However, for the purpose of describing the disclosed subject matter, the conceptual subdivision into the operational units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that may be input into the aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information may be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples may be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, may be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) may be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) may be a sample stream that may be output to a render device such as a display (212), as well as stored in the reference picture memory (357) for use in future inter-picture prediction.

Certain coded pictures, once fully reconstructed, may be used as reference pictures for future prediction. Once a coded picture is fully reconstructed and the coded picture has been identified as a reference picture (by, for example, parser (320)), the current reference picture may become part of the reference picture memory (357), and a fresh current picture memory may be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data may be in the form of, for example, temporal, spatial, or SNR enhancement layers, redundant slices, redundant pictures, forward error correction codes, and so on.

Figure 4:
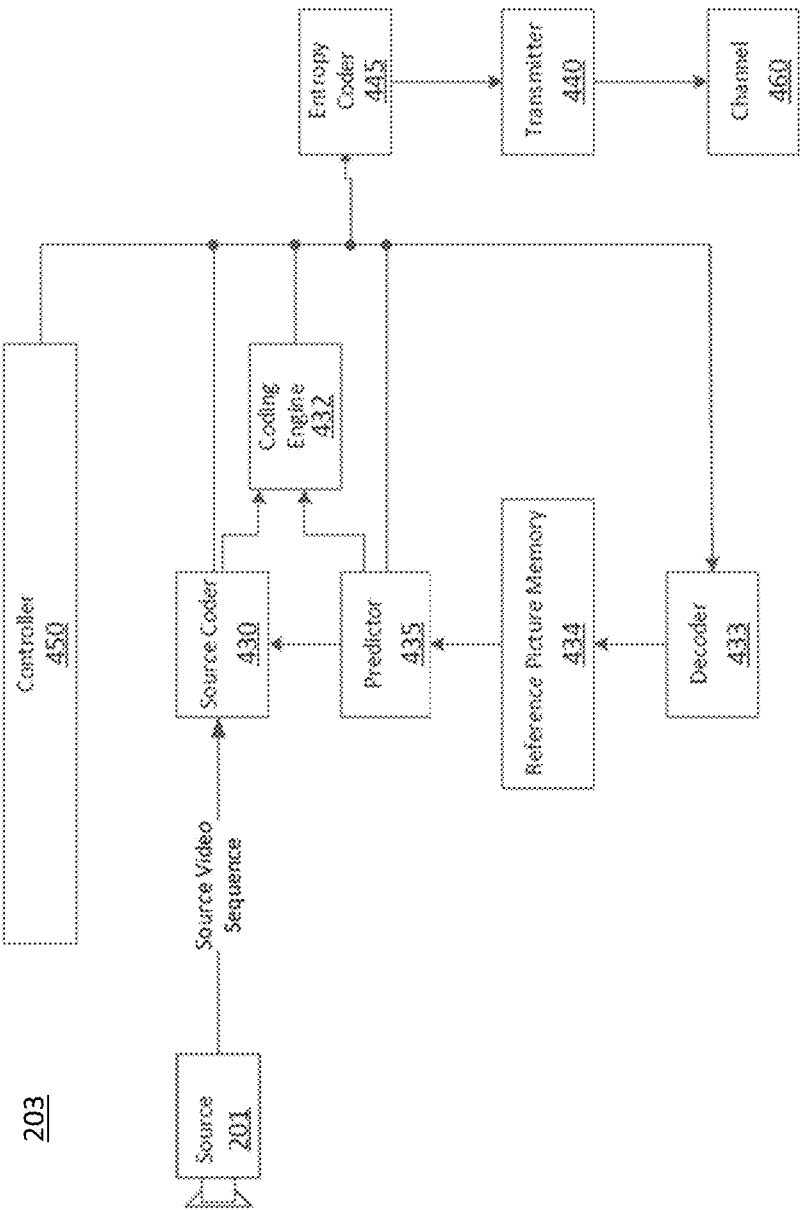
FIG. 4 is a schematic illustration of a simplified block diagram of an encoder in accordance with an embodiment.

FIG. 4 illustrates an example operational block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that may be of any suitable bit depth (for example: 8 bit, 10 bit, 12 bit, . . . ), any color space (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video. In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one operation of controller (450). The controller (450) may also control other operational units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other operations of controller (450) as they may pertain to video encoder (203) optimized for a certain system design.

Some video encoders operate in what a person skilled in the are readily recognizes as a "coding loop". As an oversimplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) may be the same as of a "remote" decoder (210), which has already been described in detail above in conjunction with FIG. 3. However, as symbols are available and en/decoding of symbols to a coded video sequence by the entropy coder (445) and the parser (320) may be lossless, the entropy decoding parts of decoder (210), including channel (312), receiver (310), buffer (315), and parser (320) may not be fully implemented in the local decoder (433).

An observation that may be made at this point is that any decoder technology, except the parsing/entropy decoding that is present in a decoder, may need to be present, in substantially identical operational form in a corresponding encoder. For this reason, the disclosed subject matter focuses on decoder operation. The description of encoder technologies may be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned operational units may be subjected to entropy coding in the entropy coder (445). The entropy coder translates the symbols as generated by the various operational units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

The encoder (203) and decoder (210) may apply an inter bi-prediction constraint for out of boundary MV adaptively. The disclosed methods may be applied regardless of whether the bi-prediction constraint for the out of boundary MV is pixel (e.g., block) based or sub-block based. In some embodiments, the bi-prediction constraint is applied with pre-defined out of boundary conditions.

Figure 22:
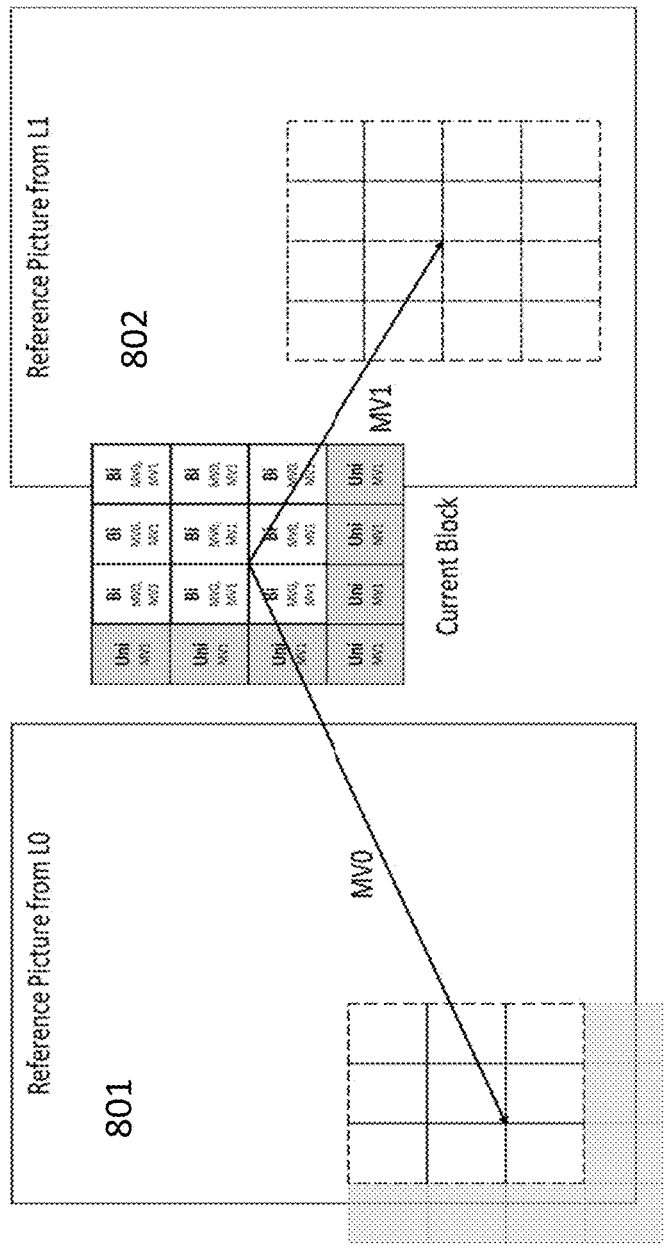
FIG. 22. is an example of sub-block level bi-prediction constraint in accordance with an embodiment.

In some embodiments, a bi-prediction constraint for out of boundary MVs may be adaptively applied by encoder (203) and decoder (210) according to the temporal direction of reference pictures (801) and (802) in FIG. 17 and FIG. 22. When both reference pictures (801) and (802) for the bi-prediction are from the same temporal direction, the bi-prediction constraint may not be applied regardless of the reference pixel position, and regular bi-prediction may be applied; otherwise, the bi-prediction may be changed to a uni-prediction mode according to the out of boundary conditions.

In some embodiments, the bi-prediction constraint for out of boundary MVs is not applied when the MVs of reference list L0 and reference list L1 are pointing to the same reference picture; otherwise, the bi-prediction may be changed to the uni-prediction mode according to the out of boundary conditions.

In some embodiments, the bi-prediction constraint for out of boundary MVs may not be applied when the MVs of reference list L0 and reference list L1 are pointing to the same reference picture, and the difference between MV of L0 and MV of L1 is within a threshold; otherwise, the bi-prediction may be changed to uni-prediction according to the out of boundary conditions.

In some embodiments, the threshold may be set as N luma samples, and when the difference between horizontal components of MV of L0 (denoted as MV0) and MV of L1 (denoted as MV1) is less than or equal to the threshold, and/or the difference between vertical components of MV0 and MV1 is less than or equal to the threshold, the bi-prediction constraint may not be applied. The condition may be denoted by the following equation:

$$\sqrt{|MV0_x - MV1_x|^2 + |MV0_y - MV1_y|^2} < N,$$

where MV0 and MV1 are motion vectors of reference list L0 and L1, respectively, x and y denote the horizontal component and vertical component of a motion vector.

In one example, the threshold value N is ¼. In another example, the threshold value N is ½. In another example, the threshold value N is 1.

Embodiments of the present disclosure are further directed to the application of the adaptive bi-prediction constraint. In some embodiments, the disclosed adaptive bi-prediction constraint may be applied by default without signaling.

In some embodiments, the disclosed adaptive bi-prediction constraint may be applied according to a high level syntax, which may be signaled at high level in the bitstream, such as sequence level, picture level, slice level, tile level, tile-group level, etc.

In some embodiments, selection of the inter bi-prediction constraint for out of boundary MV may be performed at the pixel (e.g., block) level and sub-block level.

In some embodiments, the selection of pixel level and sub-block level bi-prediction constraint may be signaled at high level in the bitstream, such as sequence level, picture level, slice level, tile level, tile-group level, etc. In some embodiments, the selection of pixel level and sub-block level bi-prediction constraint may be done adaptively at block level. In some examples the adaptive selection may be based on a threshold of the distance between the reference sample position and the picture boundary.

In some embodiments, the adaptive selection may be based on a threshold of the difference between MV of reference list L0 and MV of reference list L1. In some embodiments, the adaptive selection may be signaled at the block level. In some embodiments, the block level signaling on adaptive selection may only be allowed when the block is at the picture (or slice, or tile, or sub-picture) boundary.

In some embodiments, the bi-prediction constraint for out of boundary MV may be applied for boundaries other than picture boundaries. In some embodiments, the bi-prediction constraint may be applied for MV out of sub-picture boundaries. In some embodiments, the bi-prediction constraint may be applied for MV out of virtual boundaries. In some embodiments, the bi-prediction constraint may be applied for MV out of slice boundaries. In some embodiments, the bi-prediction constraint may be applied for MV out of tile or tile-group boundaries.

Figure 23:
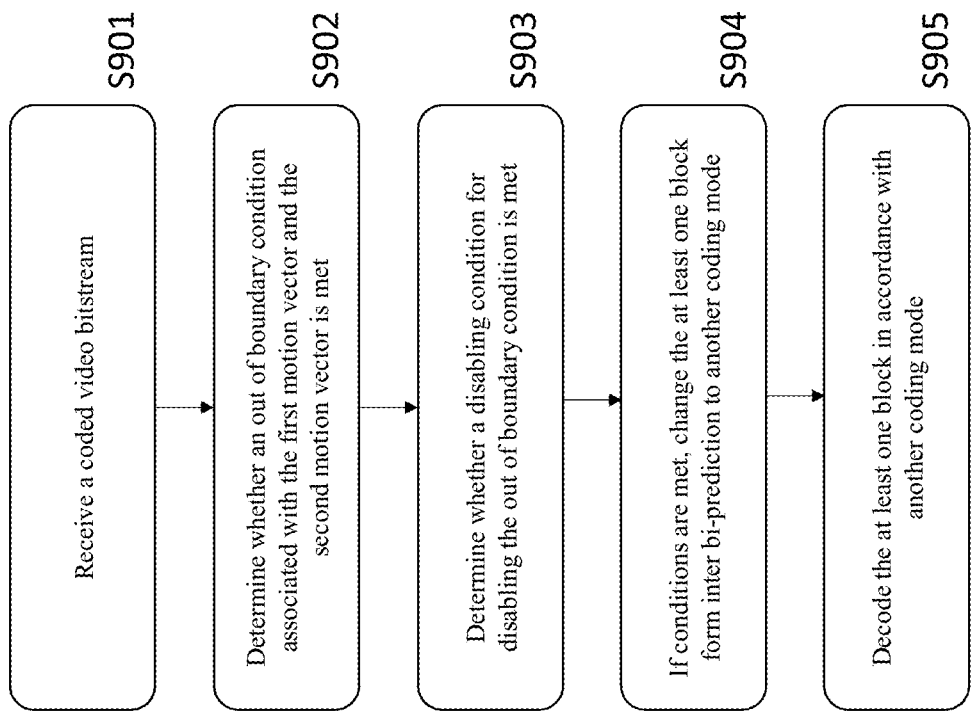
FIG. 23 depicts a flowchart of the method performed in accordance with an embodiment.

FIG. 23 illustrates a flow chart that discloses an embodiment of a process for determining and applying an inter bi-prediction constraint. The process may start at operation S901 where a coded video bitstream is received. The bitstream may include a current picture, and first and second reference pictures associated with the current picture. The current picture may include at least one block encoded in accordance with an inter bi-prediction mode, where the at least one block includes a first motion vector that points to the first reference picture and a second motion vector that points to the second reference picture.

The process proceeds to operation S902 where it is determined whether an out of boundary condition associated with the first motion vector and the second motion vector is satisfied. The process proceeds to operation S903 where it is determined whether a disabling condition for disabling the out of boundary condition is satisfied. The disabling condition may correspond to disabling the constraint on the bi-prediction mode when one of the first and second motion vectors points to a position on a corresponding reference picture that is out of a picture boundary. The process proceeds to operation S904, where if the out of boundary and disabling conditions are met, the at least one block is changed from inter bi-prediction mode to another coding mode (e.g., uni-prediction mode), where the at least one block may be decoded in accordance with the another coding mode. The process proceeds to operation S905, where if the out of boundary condition is not satisfied or the disabling condition is satisfied, the at least one block is decoded in accordance with the inter bi-prediction mode.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for inter prediction performed by at least one processor, the method including: receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture; determining whether an out of boundary condition associated with the first motion vector and the second motion vector is satisfied; in response to determining the out of boundary condition is satisfied, determining whether a disabling condition for disabling the out of boundary condition is satisfied; in response to the determining the out of boundary condition is satisfied and the disabling condition is not satisfied, (i) changing the at least one block from the inter bi-prediction mode to another coding mode, and (ii) decoding the at least one block in accordance with the another coding mode; in response to the determining the out of boundary condition is not satisfied or the disabling condition is satisfied, decoding the at least one block in accordance with the inter prediction bi-prediction mode.

(2) The method of feature (1), in which the out of boundary condition is satisfied in response to a determination that (i) the first motion vector points to a position in the first reference picture that is out of a first picture boundary of the first reference picture and has a distance from the first picture boundary that is greater than a distance threshold, or (ii) the second motion vector points to a second position in the second reference picture that is out of a second picture boundary of the second reference picture and has a distance from the second picture boundary that is greater than the distance threshold.

(3) The method according to feature (1) or (2), in which the out of boundary condition is not satisfied in in response to a determination that (i) the first motion vector points to a position in the first reference picture that is out of a first picture boundary of the first reference picture and has a distance from the first picture boundary that is greater than a distance threshold, and (ii) the second motion vector points to a second position in the second reference picture that is out of a second picture boundary of the second reference picture and has a distance from the second picture boundary that is greater than the distance threshold.

(4) The method according to any one of features (1)-(3), in which the another coding mode is the uni-prediction mode.

(5) The method according to any one of features (1)-(4), in which the disabling condition is satisfied in response to a determination the first reference picture and the second reference picture are from a same temporal direction.

(6) The method according to any one of features (1)-(5), in which the disabling condition is satisfied in response to a determination the first reference picture and the second reference picture are the same reference picture.

(7) The method according to any one of features (1)-(6), in which the disabling condition is satisfied in response to a determination the first reference picture and the second reference picture are the same reference picture, and a difference between the first motion vector and the second motion vector is within a predetermined threshold.

(8) The method according to feature (7), in which the predetermined threshold is N luma samples, and the disabling condition is satisfied in response to a determination that (i) a difference between a horizontal component of the first motion vector and a horizontal component of the second motion vector is less than or equal to the predetermined threshold or (ii) a difference between a vertical component of the first motion vector and a vertical component of the second motion vector is less than or equal to the predetermined threshold.

(9) The method according to any one of features (1)-(8), in which the disabling condition is satisfied in response to a determination the first reference picture and the second reference picture are the same reference picture, and a difference between a first reference position pointed by the first motion vector and a second reference position pointed by the second motion vector is within a predetermined threshold, wherein the predetermined threshold is N luma samples.

(10) The method according to any one of features (1)-(9), in which the coded video bitstream includes an indicator that indicates whether the disabling condition is allowed for the at least one block.

(11) An apparatus for inter prediction, including: at least one memory configured to store computer program code; at least one processor configured to access the computer program code and operate as instructed by the computer program code, the computer program code including: receiving code configured to cause the at least one processor to receive a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture; first determining code configured to cause the at least one processor to determine whether an out of boundary condition associated with the first motion vector and the second motion vector is satisfied; second determining code configured to cause the at least one processor to, in response to determining the out of boundary condition is satisfied, determine whether a disabling condition for disabling the out of boundary condition is satisfied; and changing code and decoding code, wherein in response to the determining the out of boundary condition is satisfied and the disabling condition is not satisfied, (i) the changing code causes the at least one processor to change the at least one block from the inter bi-prediction mode to another coding mode, and (ii) the decoding code causes the at least one processor to decode the at least one block in accordance with the another coding mode, and wherein in response to the determining the out of boundary condition is not satisfied or the disabling condition is satisfied, the decoding code causes at least one processor to decode the at least one block in accordance with the inter prediction bi-prediction mode.

(12) The apparatus of feature (11), in which the out of boundary condition is satisfied in response to a determination that (i) the first motion vector points to a position in the first reference picture that is out of a first picture boundary of the first reference picture and has a distance from the first picture boundary that is greater than a distance threshold, or (ii) the second motion vector points to a second position in the second reference picture that is out of a second picture boundary of the second reference picture and has a distance from the second picture boundary that is greater than the distance threshold.
(13) The apparatus according to feature (11) or (12), in which the out of boundary condition is not satisfied in in response to a determination that (i) the first motion vector points to a position in the first reference picture that is out of a first picture boundary of the first reference picture and has a distance from the first picture boundary that is greater than a distance threshold, and (ii) the second motion vector points to a second position in the second reference picture that is out of a second picture boundary of the second reference picture and has a distance from the second picture boundary that is greater than the distance threshold
(14) The apparatus according to any one of features (11)-(13), in which the another coding mode is the uni-prediction mode.
(15) The apparatus according to any one of features (11)-(14), in which the disabling condition is satisfied in response to a determination the first reference picture and the second reference picture are from a same temporal direction.
(16) The apparatus according to any one of features (11)-(15), in which the disabling condition is satisfied in response to a determination the first reference picture and the second reference picture are the same reference picture.
(17) The apparatus according to any one of features (11)-(16), in which the disabling condition is satisfied in response to a determination the first reference picture and the second reference picture are the same reference picture, and a difference between the first motion vector and the second motion vector is within a predetermined threshold.
(18) The apparatus according to feature (17), in which the predetermined threshold is N luma samples, and the disabling condition is satisfied in response to a determination that (i) a difference between a horizontal component of the first motion vector and a horizontal component of the second motion vector is less than or equal to the predetermined threshold or (ii) a difference between a vertical component of the first motion vector and a vertical component of the second motion vector is less than or equal to the predetermined threshold.
(19) The apparatus according to any one of features (11)-(18), in which the disabling condition is satisfied in response to a determination the first reference picture and the second reference picture are the same reference picture, and a difference between a first reference position pointed by the first motion vector and a second reference position pointed by the second motion vector is within a predetermined threshold, wherein the predetermined threshold is N luma samples.
(21) A non-transitory computer readable medium having instructions stored therein, which when executed by a processor cause the processor to execute a method for inter prediction, the method comprising: receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture; determining whether an out of boundary condition associated with the first motion vector and the second motion vector is satisfied; in response to determining the out of boundary condition is satisfied, determining whether a disabling condition for disabling the out of boundary condition is satisfied; in response to the determining the out of boundary condition is satisfied and the disabling condition is not satisfied, (i) changing the at least one block from the inter bi-prediction mode to another coding mode, and (ii) decoding the at least one block in accordance with the another coding mode; in response to the determining the out of boundary condition is not satisfied or the disabling condition is satisfied, decoding the at least one block in accordance with the inter prediction bi-prediction mode.

What is claimed is:

1. A method for inter prediction performed by at least one processor, the method comprising:
    receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture;
    determining whether an out of boundary condition associated with the first motion vector and the second motion vector is satisfied;
    in response to determining the out of boundary condition is satisfied, determining whether a disabling condition for disabling the out of boundary condition is satisfied;
    in response to the determining the out of boundary condition is satisfied and the disabling condition is not satisfied,
        (i) changing the at least one block from the inter bi-prediction mode to another coding mode, and
        (ii) decoding the at least one block in accordance with the another coding mode;
    in response to the determining the out of boundary condition is not satisfied or the disabling condition is satisfied, decoding the at least one block in accordance with the inter prediction bi-prediction mode,
    wherein the disabling condition is satisfied in response to a determination that the first reference picture and the second reference picture are from a same temporal direction.

2. The method of claim 1, wherein the out of boundary condition is satisfied in response to a determination that (i) the first motion vector points to a position in the first reference picture that is out of a first picture boundary of the first reference picture and has a distance from the first picture boundary that is greater than a distance threshold, or (ii) the second motion vector points to a second position in the second reference picture that is out of a second picture boundary of the second reference picture and has a distance from the second picture boundary that is greater than the distance threshold.

3. The method of claim 1, wherein the out of boundary condition is not satisfied in in response to a determination that (i) the first motion vector points to a position in the first reference picture that is out of a first picture boundary of the first reference picture and has a distance from the first picture boundary that is greater than a distance threshold, and (ii) the second motion vector points to a second position in the second reference picture that is out of a second picture boundary of the second reference picture and has a distance from the second picture boundary that is greater than the distance threshold.

4. The method of claim 1, wherein the another coding mode is the uni-prediction mode.

5. The method of claim 1, wherein the disabling condition is satisfied in response to a determination the first reference picture and the second reference picture are the same reference picture.

6. The method of claim 1, wherein the disabling condition is satisfied in response to a determination the first reference picture and the second reference picture are the same reference picture, and a difference between the first motion vector and the second motion vector is within a predetermined threshold.

7. The method of claim 6, wherein the predetermined threshold is N luma samples, and the disabling condition is satisfied in response to a determination that (i) a difference between a horizontal component of the first motion vector and a horizontal component of the second motion vector is less than or equal to the predetermined threshold or (ii) a difference between a vertical component of the first motion vector and a vertical component of the second motion vector is less than or equal to the predetermined threshold.

8. The method claim 1, wherein the disabling condition is satisfied in response to a determination the first reference picture and the second reference picture are the same reference picture, and a difference between a first reference position pointed by the first motion vector and a second reference position pointed by the second motion vector is within a predetermined threshold, wherein the predetermined threshold is N luma samples.

9. The method of claim 1, wherein the coded video bitstream includes an indicator that indicates whether the disabling condition is allowed for the at least one block.

10. An apparatus for inter prediction, comprising:
at least one memory configured to store computer program code;
at least one processor configured to access the computer program code and operate as instructed by the computer program code, the computer program code including:
receiving code configured to cause the at least one processor to receive a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture;
first determining code configured to cause the at least one processor to determine whether an out of boundary condition associated with the first motion vector and the second motion vector is satisfied;
second determining code configured to cause the at least one processor to, in response to determining the out of boundary condition is satisfied, determine whether a disabling condition for disabling the out of boundary condition is satisfied; and
changing code and decoding code,
wherein in response to the determining the out of boundary condition is satisfied and the disabling condition is not satisfied,
(i) the changing code causes the at least one processor to change the at least one block from the inter bi-prediction mode to another coding mode, and (ii) the decoding code causes the at least one processor to decode the at least one block in accordance with the another coding mode,
wherein in response to the determining the out of boundary condition is not satisfied or the disabling condition is satisfied, the decoding code causes at least one processor to decode the at least one block in accordance with the inter prediction bi-prediction mode,
wherein the disabling condition is satisfied in response to a determination that the first reference picture and the second reference picture are from a same temporal direction.

11. The apparatus of claim 10, wherein the out of boundary condition is satisfied in response to a determination that (i) the first motion vector points to a position in the first reference picture that is out of a first picture boundary of the first reference picture and has a distance from the first picture boundary that is greater than a distance threshold, or (ii) the second motion vector points to a second position in the second reference picture that is out of a second picture boundary of the second reference picture and has a distance from the second picture boundary that is greater than the distance threshold.

12. The apparatus of claim 10, wherein the out of boundary condition is not satisfied in in response to a determination that (i) the first motion vector points to a position in the first reference picture that is out of a first picture boundary of the first reference picture and has a distance from the first picture boundary that is greater than a distance threshold, and (ii) the second motion vector points to a second position in the second reference picture that is out of a second picture boundary of the second reference picture and has a distance from the second picture boundary that is greater than the distance threshold.

13. The apparatus of claim 10, wherein the another coding mode is the uni-prediction mode.

14. The apparatus of claim 10, wherein the disabling condition is satisfied in response to a determination the first reference picture and the second reference picture are the same reference picture.

15. The apparatus of claim 10, wherein the disabling condition is satisfied in response to a determination the first reference picture and the second reference picture are the same reference picture, and a difference between the first motion vector and the second motion vector is within a predetermined threshold.

16. The apparatus of claim 15, wherein the predetermined threshold is N luma samples, and the disabling condition is satisfied in response to a determination that (i) a difference between a horizontal component of the first motion vector and a horizontal component of the second motion vector is less than or equal to the predetermined threshold or (ii) a difference between a vertical component of the first motion vector and a vertical component of the second motion vector is less than or equal to the predetermined threshold.

17. The apparatus claim 10, wherein the disabling condition is satisfied in response to a determination the first reference picture and the second reference picture are the same reference picture, and a difference between a first reference position pointed by the first motion vector and a second reference position pointed by the second motion vector is within a predetermined threshold, wherein the predetermined threshold is N luma samples.

18. A non-transitory computer readable medium having instructions stored therein, which when executed by a processor cause the processor to execute a method for inter prediction, the method comprising:

receiving a coded video bitstream that includes a current picture, and first and second reference pictures associated with the current picture, the current picture including at least one block encoded in accordance with an inter bi-prediction mode, the at least one block including a first motion vector that points to the first reference picture and a second motion vector that points to the second reference picture;

determining whether an out of boundary condition associated with the first motion vector and the second motion vector is satisfied;

in response to determining the out of boundary condition is satisfied, determining whether a disabling condition for disabling the out of boundary condition is satisfied;

in response to the determining the out of boundary condition is satisfied and the disabling condition is not satisfied,
  (i) changing the at least one block from the inter bi-prediction mode to another coding mode, and
  (ii) decoding the at least one block in accordance with the another coding mode;

in response to the determining the out of boundary condition is not satisfied or the disabling condition is satisfied, decoding the at least one block in accordance with the inter prediction bi-prediction mode, wherein the disabling condition is satisfied in response to a determination that the first reference picture and the second reference picture are from a same temporal direction.

\* \* \* \* \*